(12) United States Patent
Kim et al.

(10) Patent No.: US 12,332,436 B2
(45) Date of Patent: Jun. 17, 2025

(54) SYSTEMS AND METHODS FOR WIDE FIELD OF VIEW AUGMENTED REALITY DISPLAY

(71) Applicant: NVIDIA Corporation, Santa Clara, CA (US)

(72) Inventors: Jonghyun Kim, Palo Alto, CA (US); Morgan Samuel McGuire, Waterloo, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/962,370

(22) Filed: Oct. 7, 2022

(65) Prior Publication Data
US 2023/0036831 A1 Feb. 2, 2023

Related U.S. Application Data

(63) Continuation-in-part of application No. PCT/US2021/026267, filed on Apr. 7, 2021, which is
(Continued)

(51) Int. Cl.
*G02B 27/01* (2006.01)
*G02B 27/09* (2006.01)
*G06T 19/00* (2011.01)

(52) U.S. Cl.
CPC ..... *G02B 27/0103* (2013.01); *G02B 27/0172* (2013.01); *G02B 27/0944* (2013.01);
(Continued)

(58) Field of Classification Search
CPC ............ G02B 27/0172; G02B 27/0944; G02B 27/0972; G02B 2027/0109;
(Continued)

(56) References Cited

U.S. PATENT DOCUMENTS

| | | | | |
|---|---|---|---|---|
| 6,560,019 B2 * | 5/2003 | Nakai | ................ | G02B 5/1866 359/569 |
| 6,781,701 B1 * | 8/2004 | Sweetser | ............ | G01M 11/0292 356/521 |

(Continued)

FOREIGN PATENT DOCUMENTS

| | | |
|---|---|---|
| CN | 109073882 A | 12/2018 |
| EP | 2767852 A1 | 8/2014 |

(Continued)

OTHER PUBLICATIONS

IEEE, "IEEE Standard 754-2008 (Revision of IEEE Standard 754-1985): IEEE Standard for Floating-Point Arithmetic," Aug. 29, 2008, 70 pages.
(Continued)

*Primary Examiner* — Sejoon Ahn
(74) *Attorney, Agent, or Firm* — Davis Wright Tremaine LLP

(57) ABSTRACT

In an embodiment, an augmented reality display provides an expanded eye box and enlarged field of view through the use of holographic optical elements. In at least one example, an incoupling element directs an image into a waveguide, which transmits the image to a set of outcoupling gratings. In one example, a set of holographic optical elements opposite the outcoupling elements reflect the image to the user with an enlarged field of view while maintaining an expanded eye box.

33 Claims, 15 Drawing Sheets

Related U.S. Application Data a continuation of application No. 16/844,648, filed on Apr. 9, 2020, now Pat. No. 11,385,464.

(52) U.S. Cl.
CPC ........ *G02B 27/0972* (2013.01); *G06T 19/006* (2013.01); *G02B 2027/0109* (2013.01); *G02B 2027/0123* (2013.01); *G02B 2027/0174* (2013.01); *G02B 2027/0178* (2013.01)

(58) Field of Classification Search
CPC .... G02B 2027/0123; G02B 2027/0174; G02B 2027/0178; G06T 19/006
See application file for complete search history.

(56) References Cited

U.S. PATENT DOCUMENTS

| | | | | |
|---|---|---|---|---|
| 6,987,908 | B2* | 1/2006 | Bond | G02B 6/29395 |
| | | | | 385/37 |
| 10,025,093 | B2* | 7/2018 | Wall | G02B 27/0081 |
| 10,347,048 | B2* | 7/2019 | Fu | G02B 27/0172 |
| 10,554,940 | B1* | 2/2020 | Ghazaryan | H04N 9/3173 |
| 10,757,400 | B2* | 8/2020 | Shanks | G02B 26/10 |
| 10,859,833 | B2 | 12/2020 | Bablumyan | |
| 10,963,103 | B1* | 3/2021 | Shahmohammadi | .. G02B 27/14 |
| 11,188,175 | B1* | 11/2021 | Shahmohammadi | ........................ |
| | | | | G06F 3/0304 |
| 11,320,571 | B2* | 5/2022 | Brown | G02B 6/0076 |
| 2001/0055152 | A1 | 12/2001 | Richards | |
| 2002/0127497 | A1* | 9/2002 | Brown | G02B 1/02 |
| | | | | 359/566 |
| 2008/0266530 | A1* | 10/2008 | Takahashi | G02B 27/0093 |
| | | | | 353/100 |
| 2013/0033485 | A1 | 2/2013 | Kollin et al. | |
| 2014/0140653 | A1 | 5/2014 | Brown et al. | |
| 2014/0140654 | A1 | 5/2014 | Brown et al. | |
| 2014/0146394 | A1 | 5/2014 | Tout et al. | |
| 2015/0178939 | A1 | 6/2015 | Bradski et al. | |
| 2016/0033771 | A1* | 2/2016 | Tremblay | G02B 26/10 |
| | | | | 359/851 |
| 2016/0247322 | A1 | 8/2016 | Komaki | |
| 2016/0370855 | A1 | 12/2016 | Lanier et al. | |
| 2017/0003505 | A1* | 1/2017 | Vallius | G02B 27/0101 |
| 2017/0004377 | A1* | 1/2017 | Kim | G06T 19/20 |
| 2017/0004652 | A1* | 1/2017 | Koga | G06Q 10/20 |
| 2017/0289533 | A1 | 10/2017 | Ono | |
| 2018/0109783 | A1* | 4/2018 | Austin | G01M 11/04 |
| 2018/0131926 | A1* | 5/2018 | Shanks | H04N 13/344 |
| 2018/0285642 | A1* | 10/2018 | Nishimura | G01J 3/0264 |
| 2018/0361232 | A1* | 12/2018 | Mallinson | A63F 13/98 |
| 2019/0056593 | A1* | 2/2019 | Bablumyan | G02B 27/44 |
| 2019/0204601 | A1 | 7/2019 | Ha et al. | |
| 2019/0219676 | A1 | 7/2019 | Frederiksen et al. | |
| 2020/0004019 | A1 | 1/2020 | Ishii | |
| 2020/0111259 | A1 | 4/2020 | Sears et al. | |
| 2020/0225416 | A1* | 7/2020 | Bablumyan | G02B 6/28 |
| 2021/0318537 | A1 | 10/2021 | Kim et al. | |
| 2023/0204959 | A1* | 6/2023 | Yang | G02B 27/0081 |
| | | | | 345/8 |

FOREIGN PATENT DOCUMENTS

| | | |
|---|---|---|
| EP | 3339936 A1 | 6/2018 |
| WO | 2015192117 A1 | 12/2015 |
| WO | 2018031634 A1 | 2/2018 |

OTHER PUBLICATIONS

International Search Report and Written Opinion for Application No. PCT/US2021/026267, mailed Jul. 23, 2021, filed Apr. 7, 2021, 14 pages.

International Search Report and Written Opinion for Application No. PCT/US2023/76304, mailed Mar. 13, 2024, 8 pages.

Notice of Decision to Grant for Chinese Application No. 202180004376.8, mailed Jun. 20, 2024, 6 pages.

* cited by examiner

SYSTEMS AND METHODS FOR WIDE FIELD OF VIEW AUGMENTED REALITY DISPLAY

CROSS REFERENCE TO RELATED APPLICATION

This application is a continuation-in-part of International Patent Application No. PCT/US2021/026267, filed Apr. 7, 2021, and entitled "WIDE ANGLE AUGMENTED REALITY DISPLAY," which is a continuation of U.S. patent application Ser. No. 16/844,648, filed Apr. 9, 2020, and entitled "WIDE ANGLE AUGMENTED REALITY DISPLAY," the entire contents of which are incorporated herein by reference in their entirety and for all purposes.

BACKGROUND

Augmented reality ("AR") is an emerging field in which graphical elements are added to an image of the real world. Augmented reality displays can be constructed in a number of ways. For example, some handheld devices implement a type of augmented reality by capturing an image of the real world with a camera, adding computer-generated images to the captured image, and then displaying the augmented image on the mobile display. Other devices attempt to add a generated image to eyeglasses similar to a heads-up display. Creating a wide angle field of view for an AR display is difficult for at least two reasons. First, the human eye has a wide angle of view, and to generate an AR display that matches the human eye requires considerable graphics power. In addition, it can be optically difficult to produce a wide angle display in an acceptable form factor. Additionally, limited view displays hinder users from having a more enjoyable and immersive experience.

BRIEF DESCRIPTION OF THE DRAWINGS

Various techniques will be described with reference to the drawings, in which.

DETAILED DESCRIPTION

Figure 1:
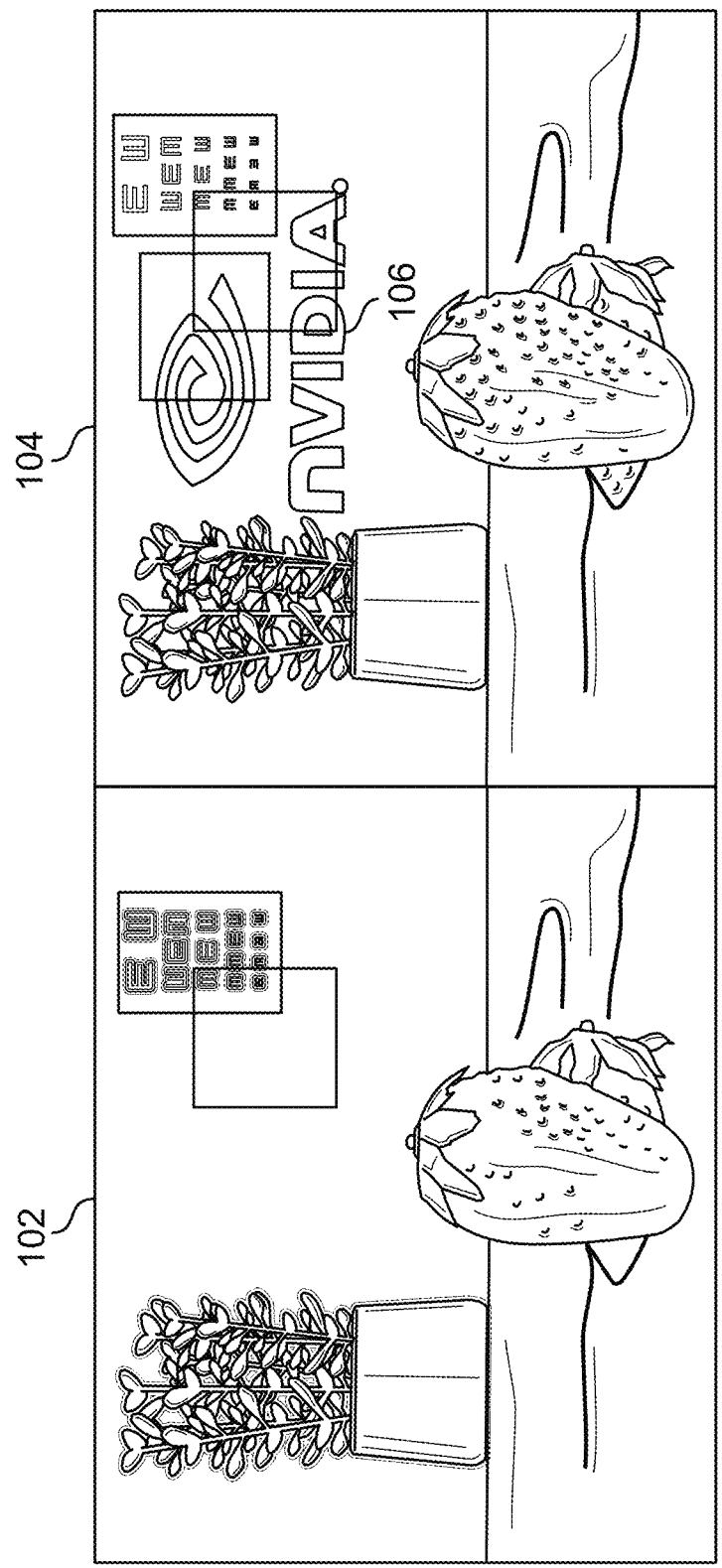
FIG. 1 illustrates an example of a scene produced by an augmented reality display, in accordance with an embodiment.

The present document describes an augmented reality ("AR") display that, in various examples, uses a holographic optical element to provide an expanded eye box and an enlarged field of view over existing eye box expander structures. A conventional eye box expander utilizes either diffractive gratings or multiple half-mirrors attached to a wave guide to provide a large eye box, but due to limitations imposed by the index of refraction of the waveguide, the field of view ("FOV") of these conventional solutions is limited to about 50 degrees. A holographic optical element ("HOE") based virtual retinal display produces a very large FOV (up to 144 degrees diagonal), but produces a very limited eye box. Although a 144-degree FOV is possible, the geometry of the human temple, eyelashes, and eye when combined with a laser light cone produce a usable limit of about 100-degree diagonal, in many examples. In at least one embodiment, a holographic optical element is added to an eye box expander to provide both an increased eye box and an increased FOV of up to 144 degrees diagonal.

In at least one embodiment, an eye box expander module projects the duplicated image (light field) to the HOE surface and the HOE, manufactured accordingly, creates multiple Maxwellian viewpoints with 144-degree FOV. In at least one embodiment, since the eye box expander duplicates all the light fields, the HOE can make multiple Maxwellian viewpoints. In at least one embodiment, this expands the eye box while preserving the 144-degree field of view. In at least one embodiment, controlling angular selectivity in HOE is a key challenge. In at least one embodiment, the HOE is created using a holographic printer. In at least one embodiment, an HOE is added to Lumus's half-mirror-based eye box expander. In at least one embodiment, Lumus's half-mirror-based eye box expander is 3 mm thick and the HOE layer is <1 mm, resulting in a target thickness of less than 4 mm. In at least one embodiment, eye relief is around 10~15 mm to cover the entire 144-degree FOV.

In at least one embodiment, Maxwellian viewpoints may also be referred to as "Maxwellian view displays" or "Maxwellian displays." In at least one embodiment, Maxwellian view displays may provide in-focus images (e.g., above a focus threshold) independent of a focus depth of a user's eye. In at least one embodiment, Maxwellian view displays may include one or more displays which collect light to a center of a pupil of the user's eye to achieve such in-focus images. In at least one embodiment, the in-focus images may include a series of images which are taken on different focal planes to generate an entirely in-focus final image or "all-in-focus image." In at least one embodiment, Maxwellian view displays may include virtual retinal displays, such as virtual retinal displays generated via a laser scanning display. In at least one embodiment, virtual retinal display generation may include drawing or projecting an image directly on the user's retina with the laser scanning display. In at least one embodiment, multiple virtual retinal displays may be generated to expand the eye box while preserving the 144-degree or other FOV.

In at least one embodiment, compared to pupil forming+ eye box expanding designs, embodiments described herein provide a much larger field of view. For example, known alternatives provide a field of view of about 50-degrees, whereas embodiments described herein can provide a field of view of up to 144-degrees. At least one embodiment provides a much larger eye box than conventional eye box expanders. In one example, an embodiment provides a 5 mm eye box vs. a 0.5 mm eye box provided by a conventional eye box expander.

Providing a large FOV display is very important for AR display manufacturers. 50-degree FOV displays can generally be satisfied with 2k×2k displays, but in order to support displays that are larger than 2k×2k, a larger FOV is preferred. For example, for a 140-degree FOV, the required pixel numbers for one eye for 20/20 vision is 8k×8k.

FIG. 1 illustrates an example of a scene produced by an augmented reality display, in accordance with an embodiment. In at least one embodiment, a first image 102 is transmitted from the real world to a user, and a second image 104 includes additional images that are added by an AR display device. In at least one embodiment, the AR display device is a set of eyeglasses, a heads-up display helmet, or a heads-up display in an aircraft, truck, car, or vehicle. In at least one embodiment, various visual elements 106 are added to the image viewed by the user using a micro light emitting diode ("LED"), liquid crystal display ("LCD"), plasma display, or emissive display device.

Figure 2:
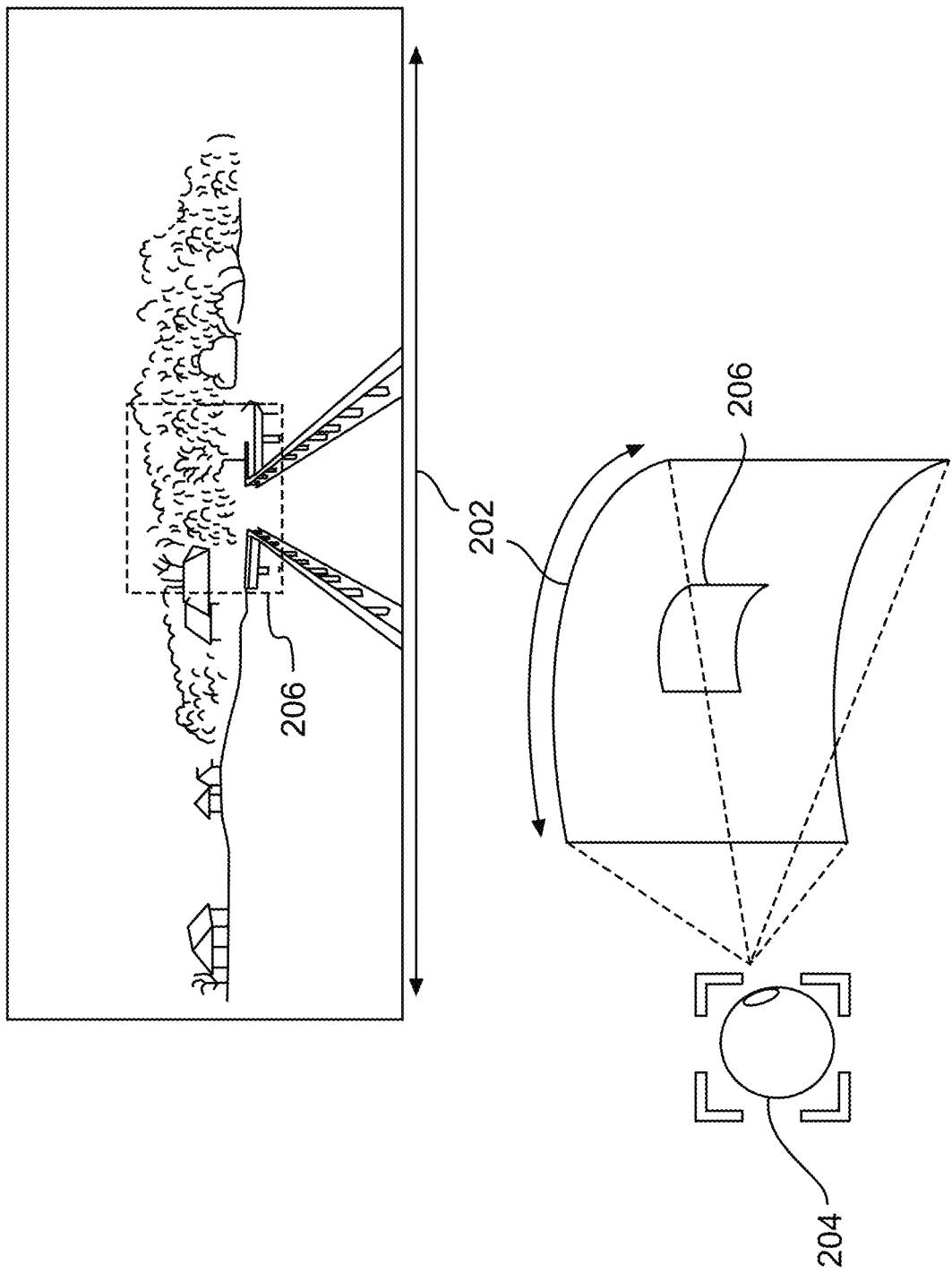
FIG. 2 illustrates an example of an augmented reality display, in accordance with an embodiment.

FIG. 2 illustrates an example of an augmented reality display, in accordance with an embodiment. In at least one embodiment, a field-of-view display comprises a field-of-view 202, a gaze 204, and a foveal inset display 206.

The field of view 202 may include greater than about 21.6 K pixels and have an arc of greater than about 180°. However, as the field of view 202 has greater than about 21.6 K pixels, the amount of computation and bandwidth is increased. To reduce the amount of computation and bandwidth utilized, the gaze 204 may be utilized to determine the position of the foveal inset display 206. The gaze 204 is utilized to determine the area of the field of view 202 to display. The center point of the foveal inset display 206 may be determined by the gaze 204 and the size of the foveal inset display 206 may, in some embodiments, be determined by a preset number of degrees from the center point. For example, in one embodiment, the preset number of degrees is 30°, resulting in an arc of 60° for the foveal inset display 206. The number of degrees may vary in each axial direction, in some embodiments.

Additionally, the foveal inset display 206 may include different resulting shapes, such as rectangular (as depicted in FIG. 2), circular, etc. The foveal inset display 206 is generated in the area of the field of view 202. The foveal inset display 206 is displayed in a higher resolution than the other portion (i.e., the peripheral image) of the field of view 202.

In one embodiment, the peripheral image is displayed with about 5 pixels per degree (ppd) resolution, while the foveal inset display 206 is displayed with about 70 ppd resolution. In another embodiment, a different display mode (e.g., 1080p instead of 780p) may achieve higher resolutions for both the foveal inset display 106 and the peripheral image. Yet further embodiments may utilize other display modes. The user may not notice areas of lower resolution (the peripheral image) because they are located in the periphery of the user. The resultant foveated display is then directed toward the user's eye or eyes. In at least one embodiment, the foveal inset display 206 can have an expanded field of view of up to 144 degrees by using the techniques described herein.

Figure 3:
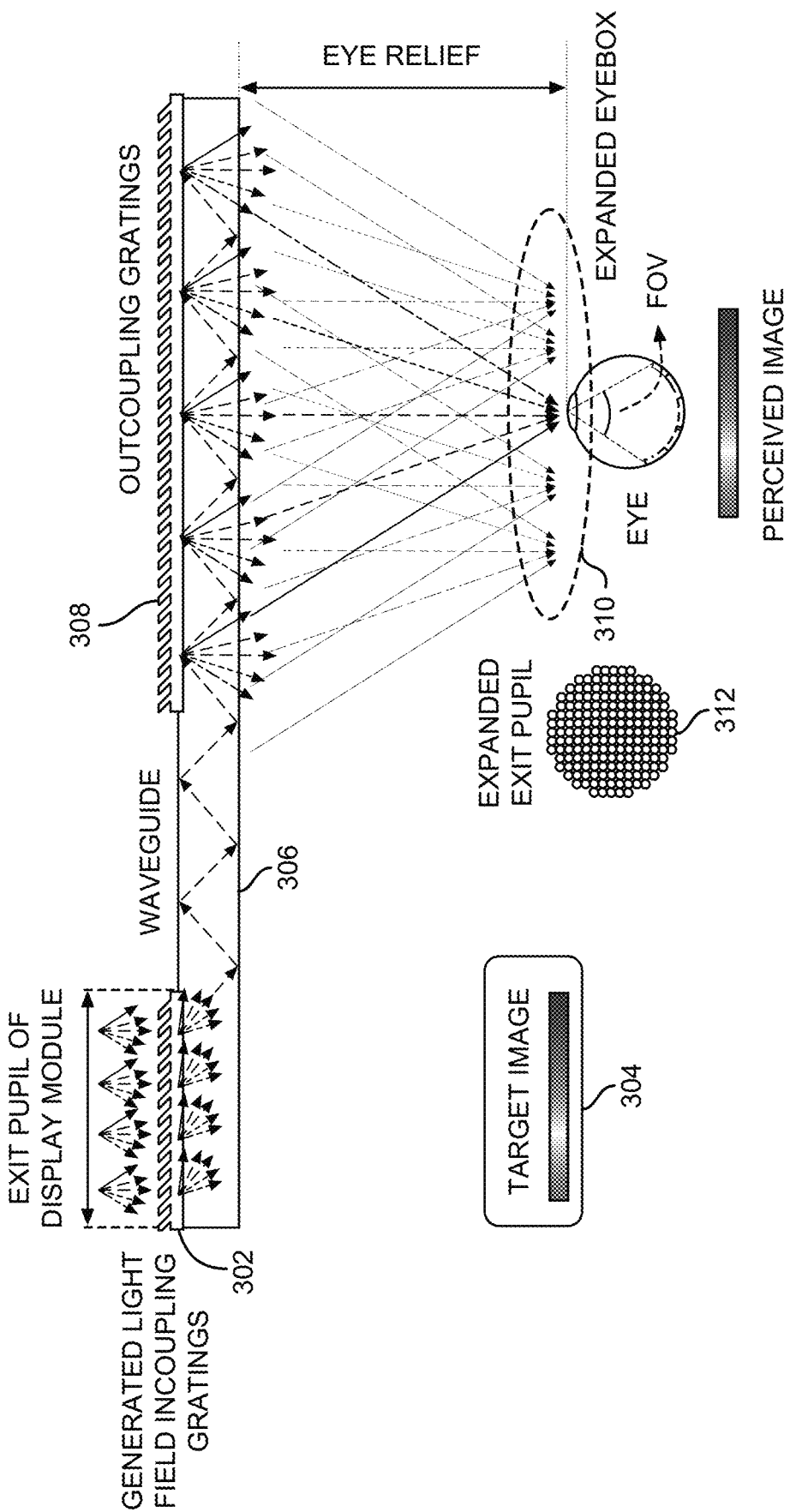
FIG. 3 illustrates an example of a wide-angle eye box expander, in accordance with an embodiment.

FIG. 3 illustrates an example of a wide-angle eye box expander, in accordance with an embodiment. In at least one embodiment, an eye box expander includes a set of incoupling gratings 302 that direct a target image 304 into a waveguide 306. In at least one embodiment, the target image 304 can be generated by a LED, micro-LED, or other electronic display. In at least one embodiment, the image is internally reflected within the waveguide 306 until the image encounters a set of outcoupling gratings 308 which duplicate and direct the image out of the waveguide. In at least one embodiment, the resulting eye box 310 and exit pupil 312 are expanded relative to that produced by the display module from which the image was created. In at least one embodiment, the field of view for the expanded image is limited to approximately 50 degrees due to limitations in manufacturing the outcoupling gratings 308.

Figure 4:
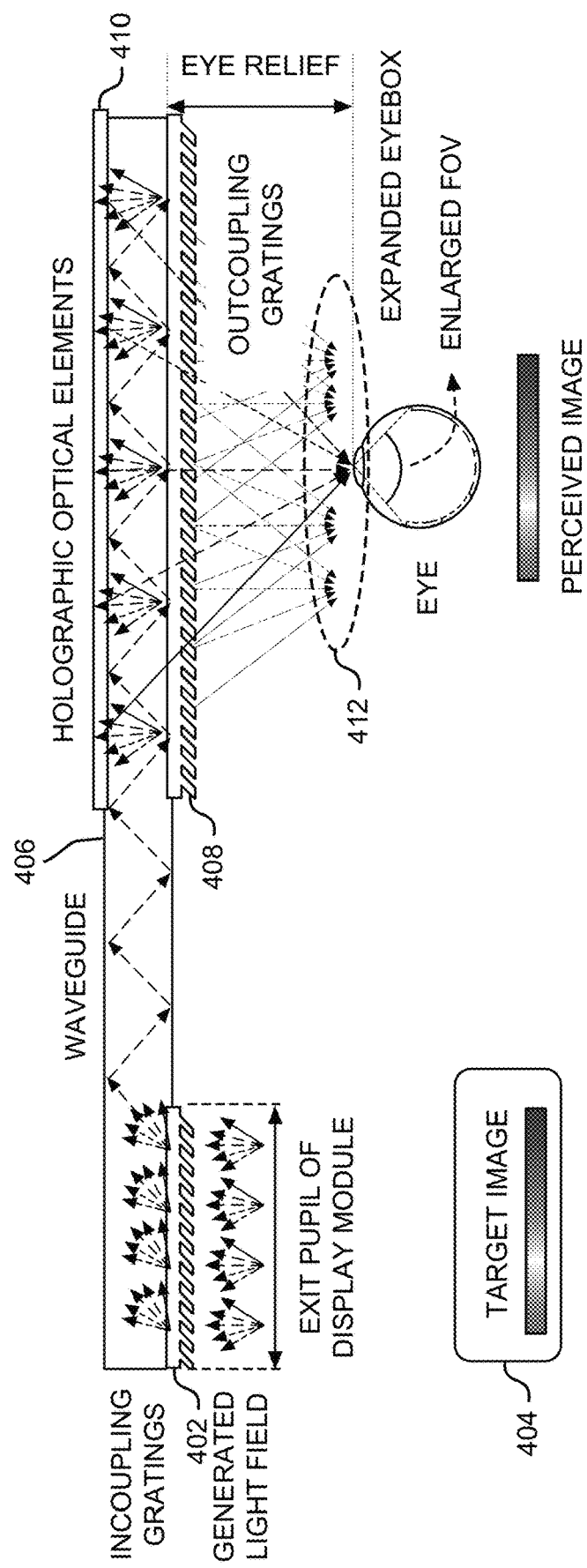
FIG. 4 illustrates an example of a wide-angle eye box expander that utilizes a holographic optical element, in accordance with an embodiment.

FIG. 4 illustrates an example of wide-angle eye box expander that utilizes a holographic optical element, in accordance with an embodiment. In at least one embodiment, an eye box expander includes a set of incoupling gratings 402 that direct a target image 404 into a waveguide 406. In at least one embodiment, the target image 404 can be generated by a LED, micro-LED, or other electronic display. In at least one embodiment, the image is internally reflected within the waveguide 406 until the image encounters a set of outcoupling gratings 408 which duplicate and direct the image across the waveguide 406 to a holographic optical element 410 attached to the side of the waveguide 406 opposite the outcoupling gratings 408. In at least one embodiment, the holographic optical element 410, creates multiple Maxwellian viewpoints with up to a 144 degree field of view. In at least one embodiment, since the eye box expander duplicates the input light fields, the holographic optical element can make multiple Maxwellian viewpoints, which expands the eye box while preserving the field of view. In at least one embodiment, the holographic optical element is created using a holographic printer.

In at least one embodiment, the resulting eye box 412 and field of view are expanded relative to that produced by the display module from which the image was created. In at least one embodiment, the field of view for the expanded image is expanded by up to 144 degrees.

Figure 5:
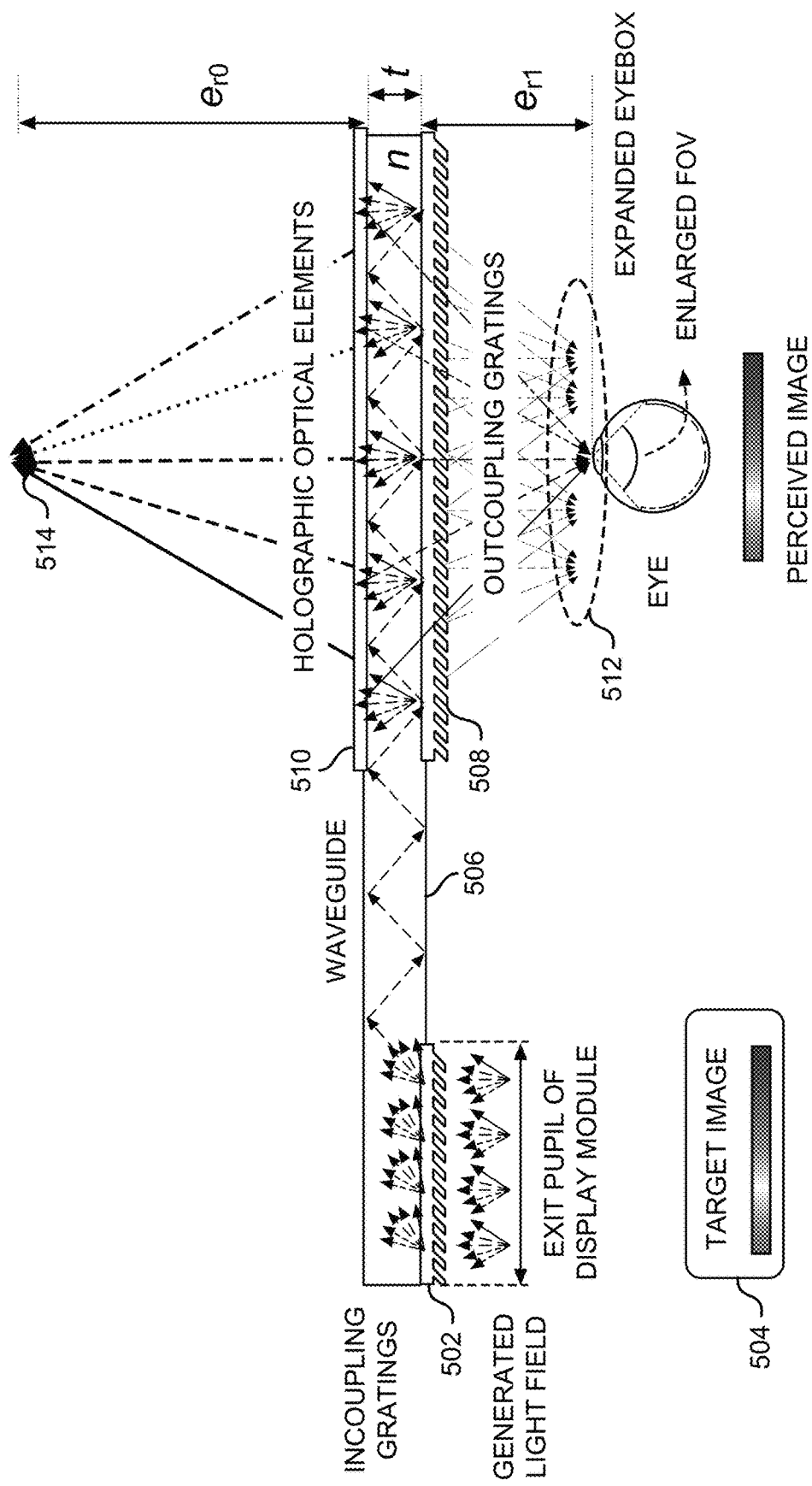
FIG. 5 illustrates an example of an image generated by a wide-angle eye box expander that utilizes a holographic optical element, in accordance with an embodiment.

FIG. 5 illustrates an example of an image generated by a wide-angle eye box expander that utilizes a holographic optical element, in accordance with an embodiment. In at least one embodiment, an eye box expander includes a set of incoupling gratings 502 that direct a target image 504 into a waveguide 506. In at least one embodiment, the target image 504 can be generated by a LED, micro-LED, or other electronic display. In at least one embodiment, the image is internally reflected within the waveguide 506 until the image encounters a set of outcoupling gratings 508 which duplicate and direct the image across the waveguide 506 to a holographic optical element 510 attached to the side of the waveguide 506 opposite the outcoupling gratings 508. In at least one embodiment, the holographic optical element 510 creates multiple Maxwellian viewpoints with up to a 144 degree field of view. In at least one embodiment, since the eye box expander duplicates the input light fields, the holographic optical element can make multiple Maxwellian viewpoints 514, which expands the eye box while preserving the field of view. In at least one embodiment, a Maxwellian display presents an all-in-focus image to the viewer where the image formed on the retina is independent of the optical power of the eye. In at least one embodiment, the holographic optical element is created using a holographic printer.

In at least one embodiment, the resulting eye box 512 and field of view are expanded relative to that produced by the display module from which the image was created. In at least one embodiment, the field of view for the image is expanded by up to 144 degrees.

Figure 6:
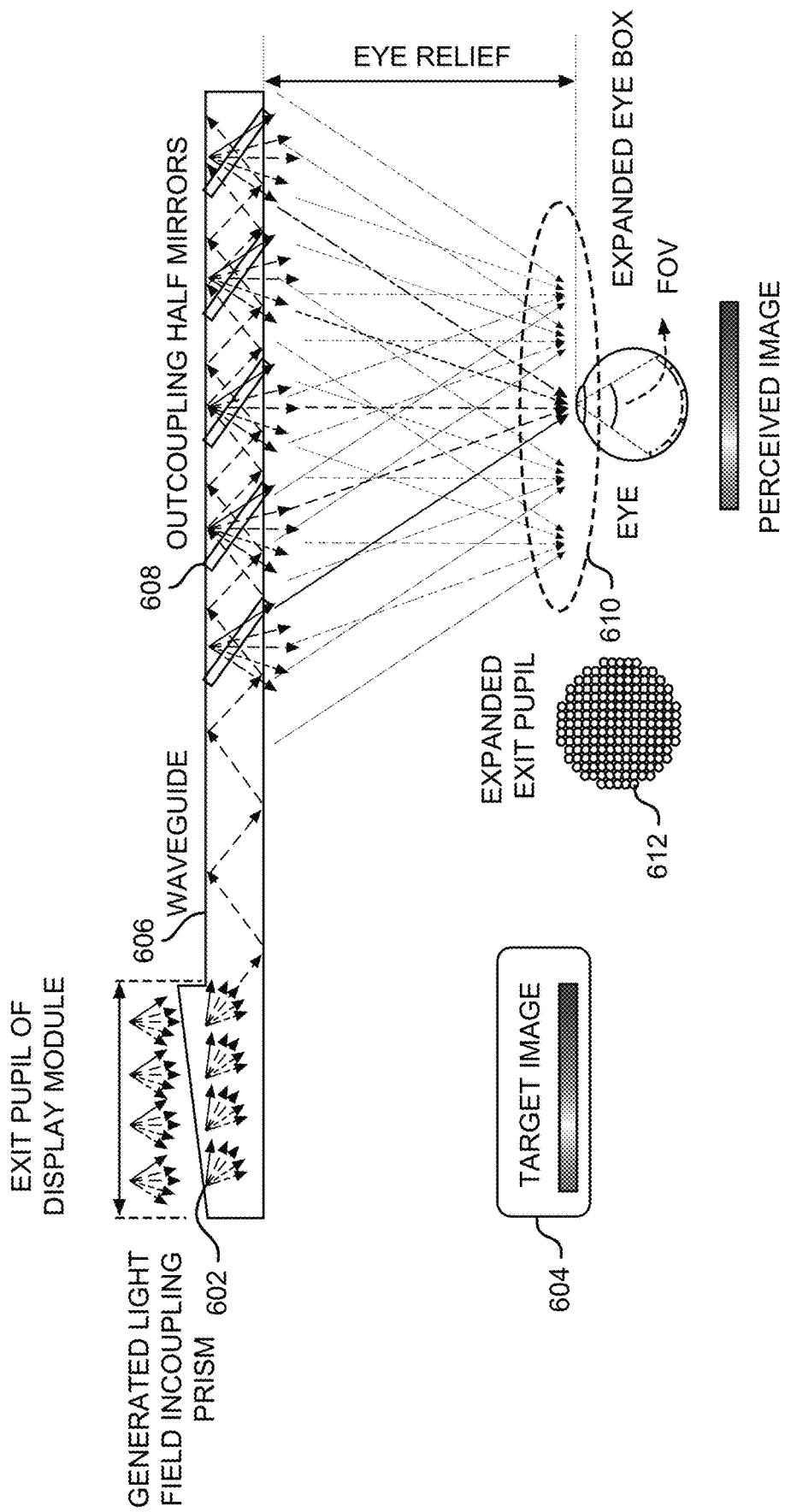
FIG. 6 illustrates an example of a wide-angle eye box expander that utilizes a holographic optical element and half-silvered mirrors as an outcoupling element, in accordance with an embodiment.

FIG. 6 illustrates an example of wide-angle eye box expander that utilizes a holographic optical element and half-silvered mirrors as an outcoupling element, in accordance with an embodiment. In at least one embodiment, an eye box expander includes an incoupling prism 602 that directs a target image 604 into a waveguide 606. In at least one embodiment, the target image 604 can be generated by a LED, micro-LED, or other electronic display. In at least one embodiment, the image is internally reflected within the waveguide 606 until the image encounters a set of outcoupling half-mirrors 608 which duplicate and direct the image out of the waveguide. In at least one embodiment, the resulting eye box 610 and exit pupil 612 are expanded relative to that produced by the display module from which the image was created.

Figure 7:
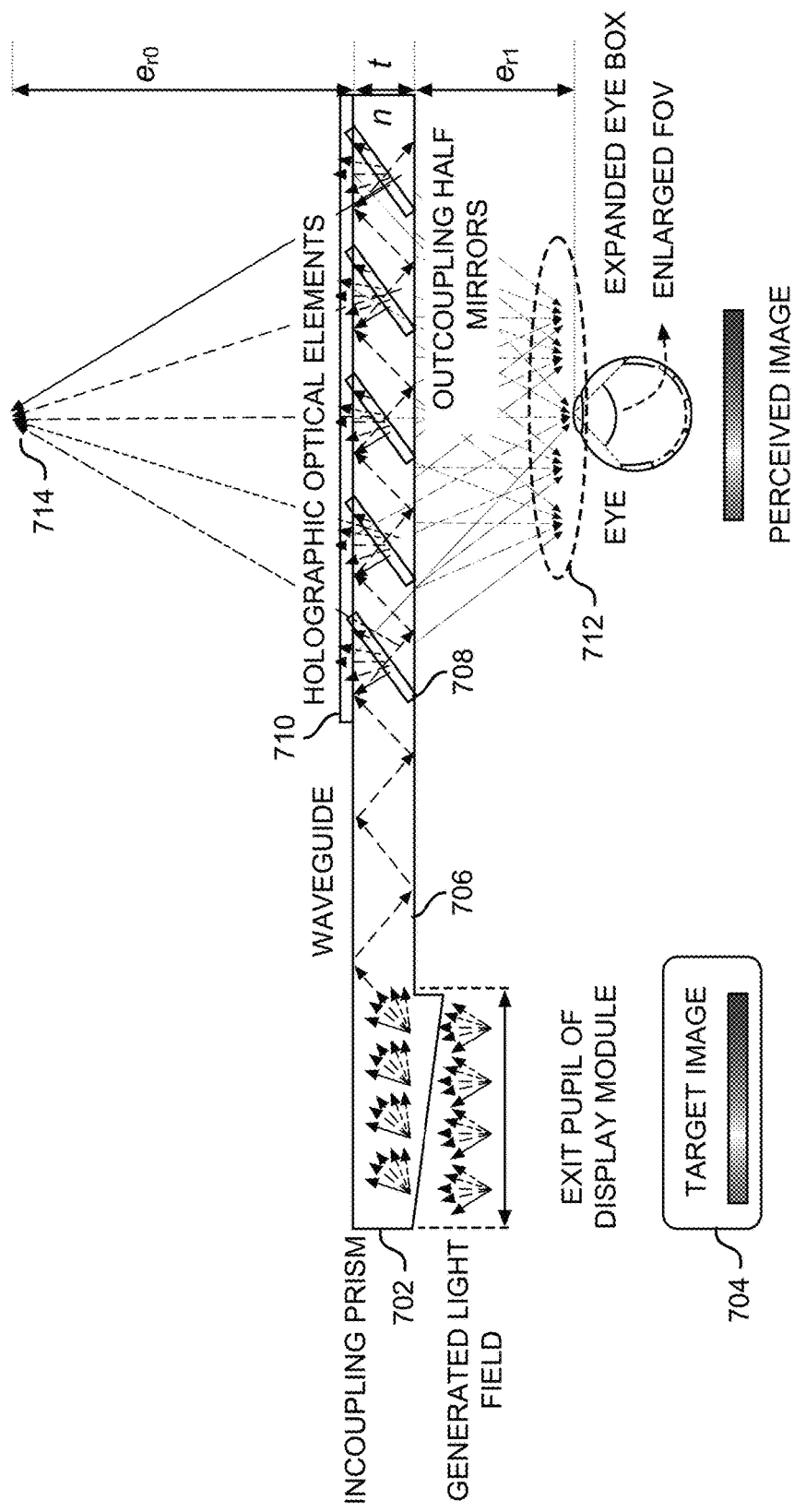
FIG. 7 illustrates an example of an image generated by a wide-angle eye box expander that utilizes a holographic optical element and half-silvered mirrors as an outcoupling element, in accordance with an embodiment.

FIG. 7 illustrates an example of an image generated by a wide-angle eye box expander that utilizes a holographic optical element and half-silvered mirrors as an outcoupling element, in accordance with an embodiment. In at least one embodiment, an eye box expander includes an incoupling prism 702 that direct a target image 704 into a waveguide 706. In at least one embodiment, the target image 704 can be generated by a LED, micro-LED, or other electronic display. In at least one embodiment, the image is internally reflected within the waveguide 706 until the image encounters a set of outcoupling half-mirrors 708 which duplicate and direct the image across the waveguide 706 to a holographic optical element 710 attached to the side of the waveguide 706 opposite the outcoupling half-mirrors 708. In at least one embodiment, the holographic optical element 710 creates multiple Maxwellian viewpoints with up to a 144 degree field of view. In at least one embodiment, since the eye box expander duplicates the input light fields, the holographic optical element can make multiple Maxwellian viewpoints 714, which expands the eye box while preserving the field of view. In at least one embodiment, a Maxwellian display presents an all-in-focus image to the viewer where the image formed on the retina is independent of the optical power of the eye. In at least one embodiment, the holographic optical element is created using a holographic printer.

In at least one embodiment, the resulting eye box 712 and field of view are expanded relative to that produced by the display module from which the image was created. In at least one embodiment, the field of view for the expanded image is expanded by up to 144 degrees.

Figure 8:
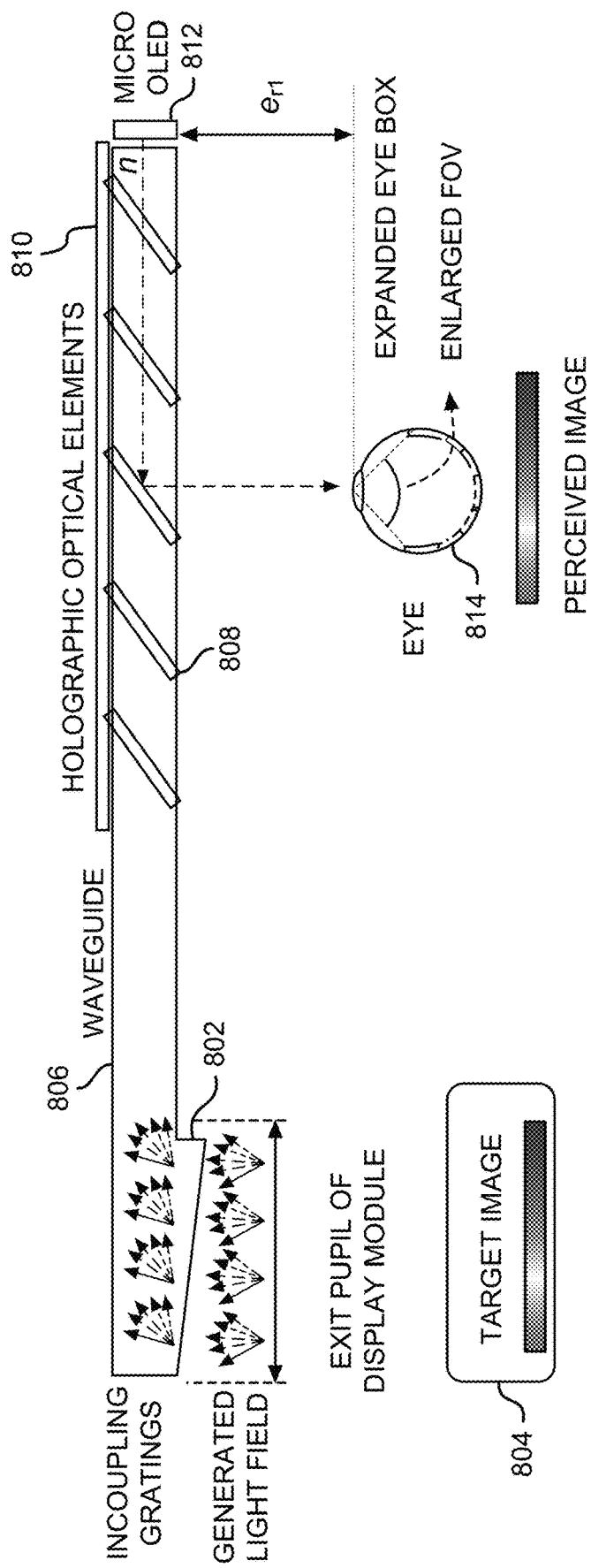
FIG. 8 illustrates an example of a wide-angle eye box expander that combines images from a micro LED, in accordance with an embodiment.

FIG. 8 illustrates an example of wide-angle eye box expander that combines images from a micro LED, in accordance with an embodiment. In at least one embodiment, an eye box expander includes an incoupling prism 802 that directs a target image 804 into a waveguide 806. In at least one embodiment, the target image 804 can be generated by a LED, micro-LED, or other electronic display. In at least one embodiment, the image is internally reflected within the waveguide 806 until the image encounters a set of outcoupling half-mirrors 808 which duplicate and direct the image across the waveguide 806 to a holographic optical element 810 attached to the side of the waveguide 806 opposite the outcoupling half-mirrors 808. In at least one embodiment, the holographic optical element 810 creates multiple Maxwellian viewpoints with up to a 144 degree field of view. In at least one embodiment, since the eye box expander duplicates the input light fields, the holographic optical element can make multiple Maxwellian viewpoints, which expands the eye box while preserving the field of view. In at least one embodiment, the holographic optical element is created using a holographic printer.

In at least one embodiment, a micro organic light emitting display ("OLED") 812 emits an image into the end of the waveguide 806. In at least one embodiment, the image emitted by the micro OLED 812 is reflected by the outcoupling half-mirrors 808 out of the waveguide 806 and to the eye 814 of the user. In at least one embodiment, the image presented to the eye 814 of the user is a combination of the target image 804 and an image emitted by the micro OLED 812. In at least one embodiment, the resulting eye box and field of view are expanded relative to that produced by the display module from which the image was created. In at least one embodiment, the field of view for the expanded image is expanded by up to 144 degrees.

Figure 9:
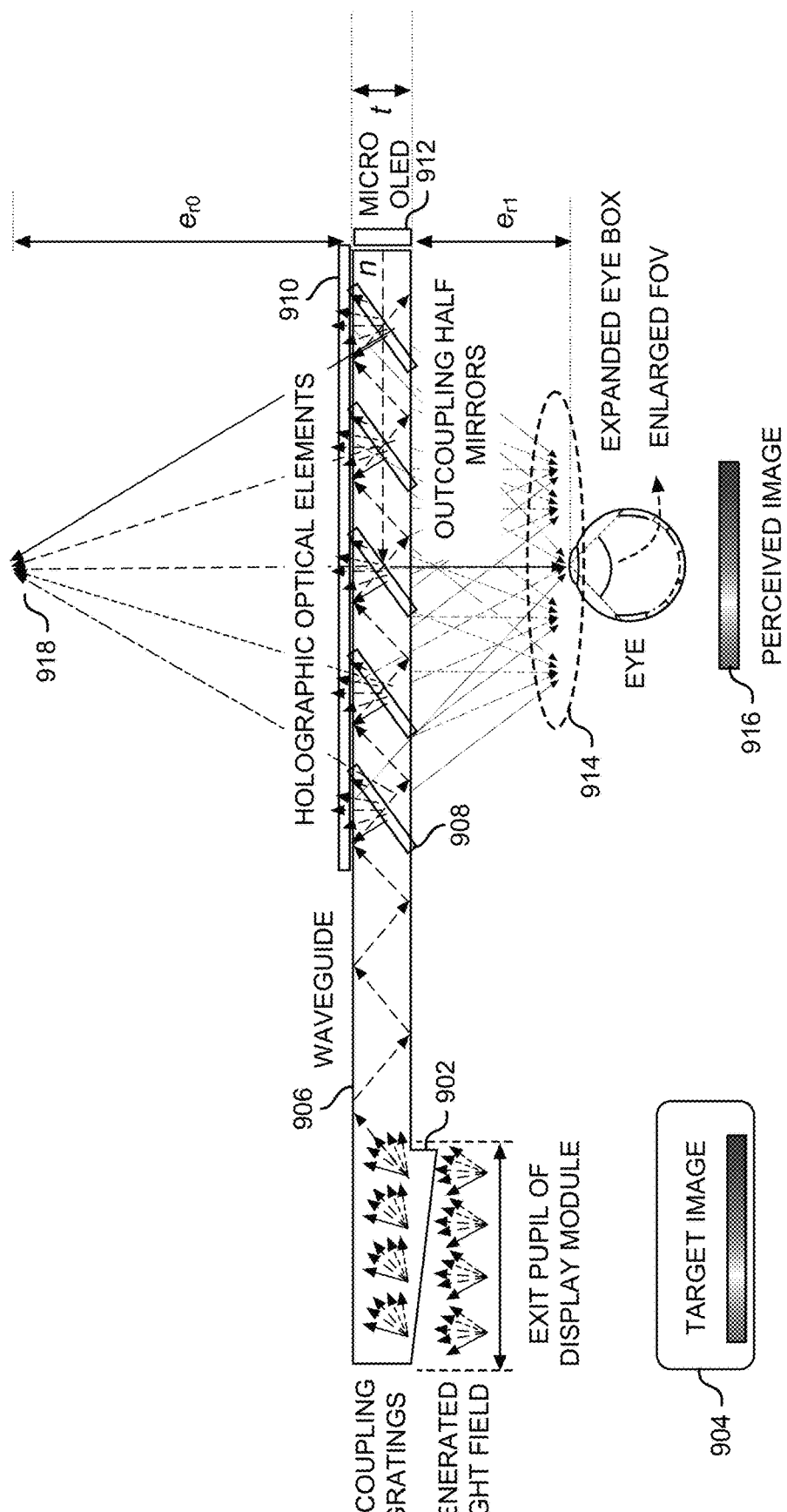
FIG. 9 illustrates an example of an image generated by a wide-angle eye box expander that combines images from a micro LED, in accordance with an embodiment.

FIG. 9 illustrates an example of an image generated by a wide-angle eye box expander that combines images from a micro LED, in accordance with an embodiment. In at least one embodiment, an eye box expander includes an incoupling prism 902 that direct a target image 904 into a waveguide 906. In at least one embodiment, the target image 904 can be generated by a LED, micro-LED, or other electronic display. In at least one embodiment, the image is internally reflected within the waveguide 906 until the image encounters a set of outcoupling half-mirrors 908 which duplicate and direct the image across the waveguide 906 to a holographic optical element 910 attached to the side of the waveguide 906 opposite the outcoupling half-mirrors 908. In at least one embodiment, the holographic optical element 910, the holographic optical element 910 creates multiple Maxwellian viewpoints with up to a 144 degree field of view. In at least one embodiment, since the eye box expander duplicates the input light fields, the holographic optical element can make multiple Maxwellian viewpoints 918, which expands the eye box 914 while preserving the field of view. In at least one embodiment, the holographic optical element is created using a holographic printer.

In at least one embodiment, a micro organic light emitting display ("OLED") 912 emits an image into the end of the waveguide 906. In at least one embodiment, the image emitted by the micro OLED 912 is reflected by the outcoupling half-mirrors 908 out of the waveguide 906 and to the eye of the user. In at least one embodiment, the perceived image 916 is a combination of the target image 904 and an image emitted by the micro OLED 912. In at least one embodiment, the resulting eye box 914 and field of view are expanded relative to that produced by the display module from which the image was created. In at least one embodiment, the field of view for the expanded image is expanded by up to 144 degrees.

Figure 10:
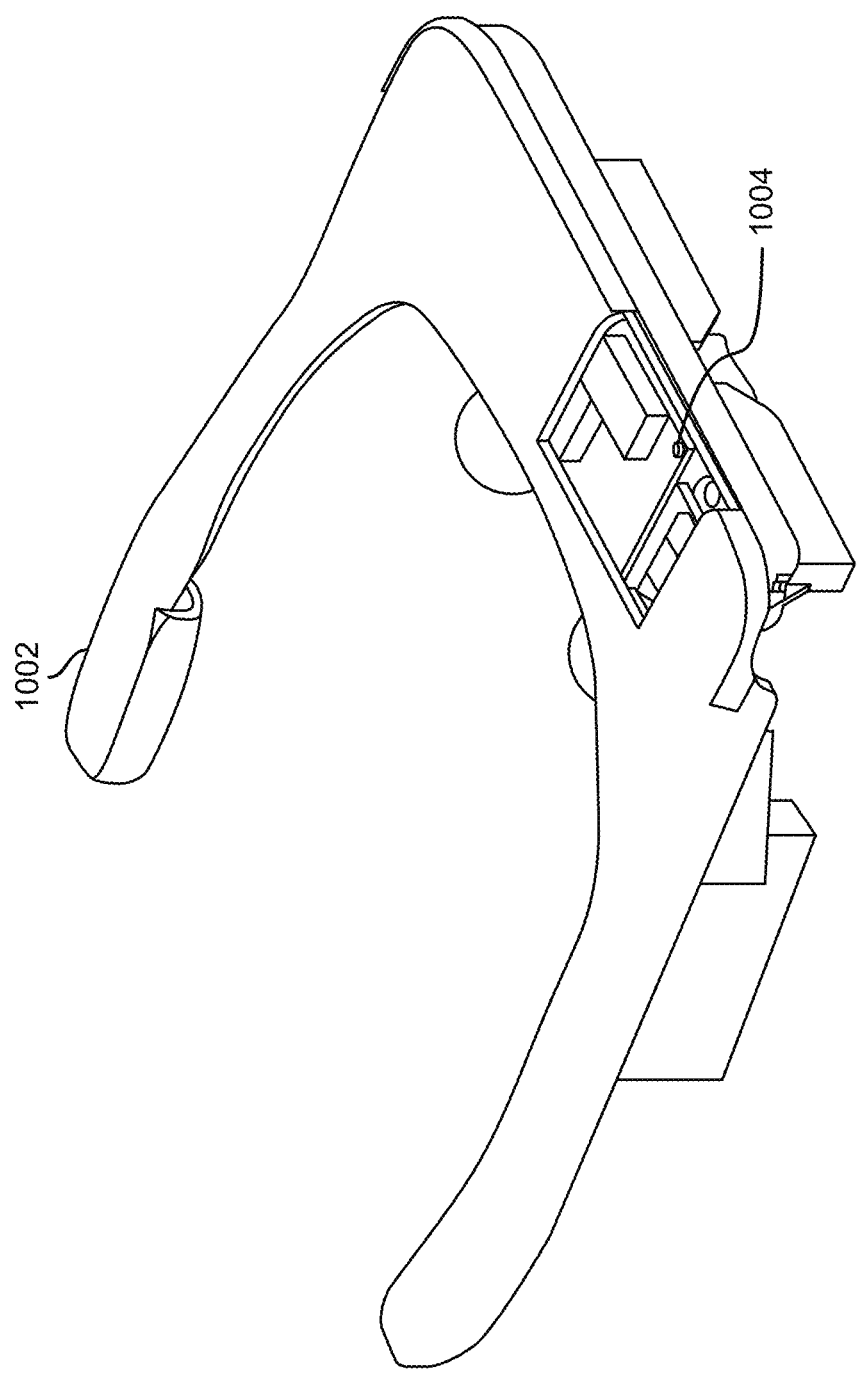
FIG. 10 illustrates an example of an augmented reality display, in accordance with an embodiment.

FIG. 10 illustrates an example of an augmented reality display, in accordance with an embodiment. In at least one embodiment, the eye box expander described above is integrated into an augmented reality headset 1002. In at least one embodiment, a computer system 1004 on the AR headset includes a processor and memory storing executable instructions that, as a result of being executed by the processor, cause the computer system to generate image data which is sent to an electronic display. In at least one embodiment, the eye box expander combines transmitted images with images added through the eye box expander to create an augmented reality display with a wide field and an expanded eye box. In at least one embodiment, the computer system can be based on a processor or GPU as shown in FIGS. 11-15 and described in the associated description.

Figure 11:
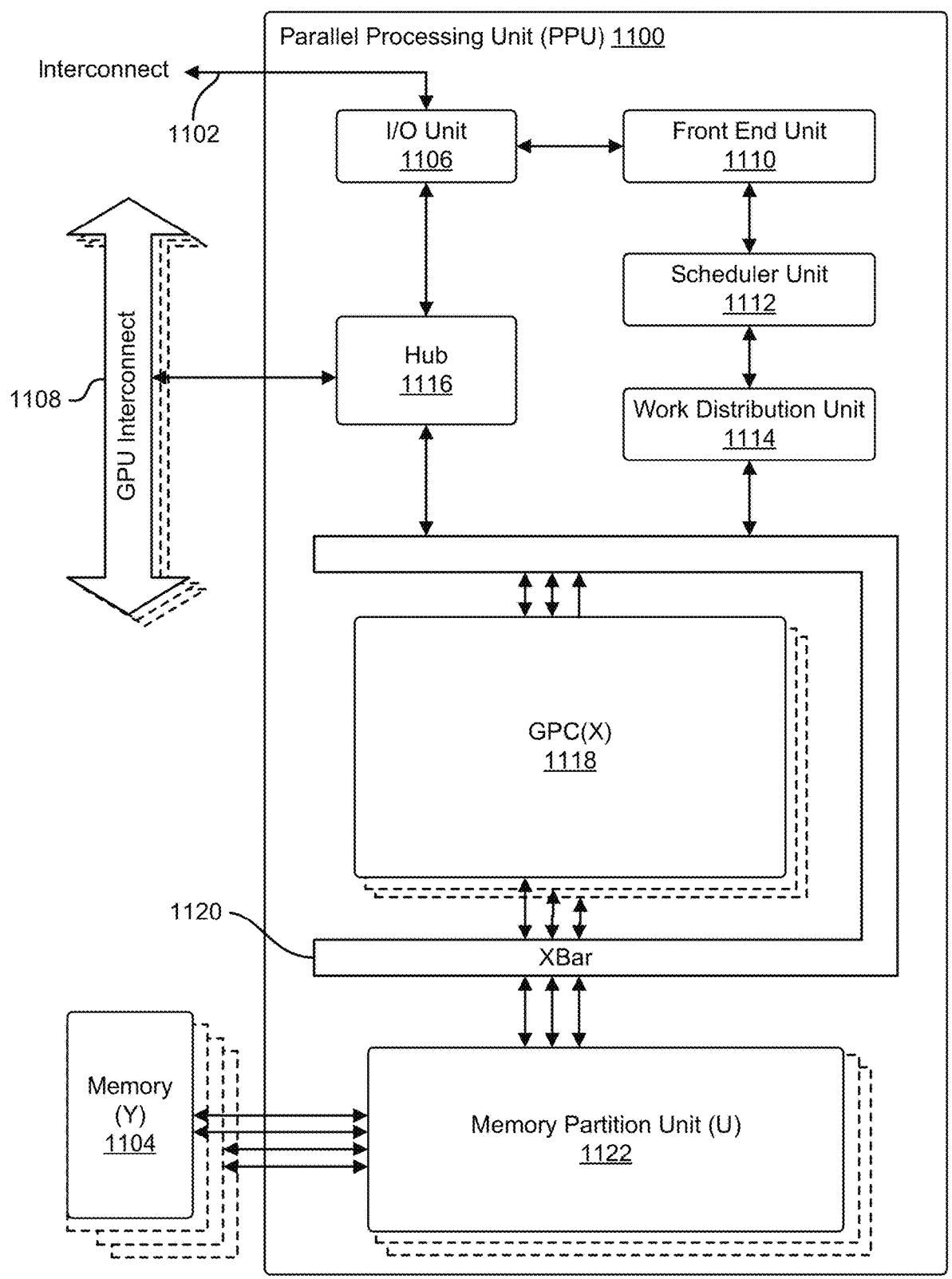
FIG. 11 illustrates an example of a parallel processing unit ("PPU"), in accordance with an embodiment.

FIG. 11 illustrates a parallel processing unit ("PPU") 1100, in accordance with one embodiment. In an embodiment, the PPU 1100 is configured with machine-readable code that, if executed by the PPU, causes the PPU to perform some or all of the processes and techniques described throughout this disclosure. In an embodiment, the PPU 1100 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In an embodiment, a thread refers to a thread of execution and is an instantiation of a set of instructions configured to be executed by the PPU 1100. In an embodiment, the PPU 1100 is a graphics processing unit ("GPU") configured to implement a graphics rendering pipeline for processing three-dimensional ("3D") graphics data in order to generate two-dimensional ("2D") image data for display on a display device such as a liquid crystal display (LCD) device. In an embodiment, the PPU 1100 is utilized to perform computations such as linear algebra operations and machine-learning operations. FIG. 11 illustrates an example parallel processor for illustrative purposes only and should be construed as a non-limiting example of processor architectures contemplated within the scope of this disclosure and that any suitable processor may be employed to supplement and/or substitute for the same.

In an embodiment, one or more PPUs are configured to accelerate High Performance Computing ("HPC"), data center, and machine learning applications. In an embodiment, the PPU 1100 is configured to accelerate deep learning systems and applications including the following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In an embodiment, the PPU 1100 includes an Input/Output ("I/O") unit 1106, a front-end unit 1110, a scheduler unit 1112, a work distribution unit 1114, a hub 1116, a crossbar ("Xbar") 1120, one or more general processing clusters ("GPCs") 1118, and one or more partition units 1122. In an embodiment, the PPU 1100 is connected to a host processor or other PPUs 1100 via one or more high-speed GPU interconnects 1108. In an embodiment, the PPU 1100 is connected to a host processor or other peripheral devices via an interconnect 1102. In an embodiment, the PPU 1100 is connected to a local memory comprising one or more memory devices 1104. In an embodiment, the local memory comprises one or more dynamic random access memory ("DRAM") devices. In an embodiment, the one or more DRAM devices are configured and/or configurable as high-bandwidth memory ("HBM") subsystems, with multiple DRAM dies stacked within each device.

The high-speed GPU interconnect 1108 may refer to a wire-based multi-lane communications link that is used by systems to scale and include one or more PPUs 1100 combined with one or more CPUs, supports cache coherence between the PPUs 1100 and CPUs, and CPU mastering. In an embodiment, data and/or commands are transmitted by the high-speed GPU interconnect 1108 through the hub 1116 to/from other units of the PPU 1100 such as one or more copy engines, video encoders, video decoders, power management units, and other components which may not be explicitly illustrated in FIG. 11.

In an embodiment, the I/O unit 1106 is configured to transmit and receive communications (e.g., commands, data) from a host processor (not illustrated in FIG. 11) over the interconnect 1102. In an embodiment, the I/O unit 1106 communicates with the host processor directly via the interconnect 1102 or through one or more intermediate devices such as a memory bridge. In an embodiment, the I/O unit 1106 may communicate with one or more other processors, such as one or more of the PPUs 1100 via the interconnect 1102. In an embodiment, the I/O unit 1106 implements a Peripheral Component Interconnect Express ("PCIe") interface for communications over a PCIe bus. In an embodiment, the I/O unit 1106 implements interfaces for communicating with external devices.

In an embodiment, the I/O unit 1106 decodes packets received via the interconnect 1102. In an embodiment, at least some packets represent commands configured to cause the PPU 1100 to perform various operations. In an embodiment, the I/O unit 1106 transmits the decoded commands to various other units of the PPU 1100 as specified by the commands. In an embodiment, commands are transmitted to the front-end unit 1110 and/or transmitted to the hub 1116 or other units of the PPU 1100 such as one or more copy engines, a video encoder, a video decoder, a power management unit, etc. (not explicitly illustrated in FIG. 11). In an embodiment, the I/O unit 1106 is configured to route communications between and among the various logical units of the PPU 1100.

In an embodiment, a program executed by the host processor encodes a command stream in a buffer that provides workloads to the PPU 1100 for processing. In an embodiment, a workload comprises instructions and data to be processed by those instructions. In an embodiment, the buffer is a region in a memory that is accessible (e.g., read/write) by both the host processor and the PPU 1100—the host interface unit may be configured to access the buffer in a system memory connected to the interconnect 1102 via memory requests transmitted over the interconnect 1102 by the I/O unit 1106. In an embodiment, the host processor writes the command stream to the buffer and then transmits a pointer to the start of the command stream to the PPU 1100 such that the front-end unit 1110 receives pointers to one or more command streams and manages the one or more streams, reading commands from the streams and forwarding commands to the various units of the PPU 1100.

In an embodiment, the front-end unit 1110 is coupled to a scheduler unit 1112 that configures the various GPCs 1118 to process tasks defined by the one or more streams. In an embodiment, the scheduler unit 1112 is configured to track state information related to the various tasks managed by the scheduler unit 1112 where the state information may indicate which GPC 1118 a task is assigned to, whether the task is active or inactive, a priority level associated with the task, and so forth. In an embodiment, the scheduler unit 1112 manages the execution of a plurality of tasks on the one or more GPCs 1118.

In an embodiment, the scheduler unit 1112 is coupled to a work distribution unit 1114 that is configured to dispatch tasks for execution on the GPCs 1118. In an embodiment, the work distribution unit 1114 tracks a number of scheduled tasks received from the scheduler unit 1112 and the work distribution unit 1114 manages a pending task pool and an active task pool for each of the GPCs 1118. In an embodiment, the pending task pool comprises a number of slots (e.g., 32 slots) that contain tasks assigned to be processed by a particular GPC 1118; the active task pool may comprise a number of slots (e.g., 4 slots) for tasks that are actively being processed by the GPCs 1118 such that as a GPC 1118 completes the execution of a task, that task is evicted from the active task pool for the GPC 1118 and one of the other tasks from the pending task pool is selected and scheduled for execution on the GPC 1118. In an embodiment, if an active task is idle on the GPC 1118, such as while waiting for a data dependency to be resolved, then the active task is evicted from the GPC 1118 and returned to the pending task pool while another task in the pending task pool is selected and scheduled for execution on the GPC 1118.

In an embodiment, the work distribution unit 1114 communicates with the one or more GPCs 1118 via XBar 1120. In an embodiment, the XBar 1120 is an interconnect network that couples many of the units of the PPU 1100 to other units of the PPU 1100 and can be configured to couple the work distribution unit 1114 to a particular GPC 1118. Although not shown explicitly, one or more other units of the PPU 1100 may also be connected to the XBar 1120 via the hub 1116.

The tasks are managed by the scheduler unit 1112 and dispatched to a GPC 1118 by the work distribution unit 1114. The GPC 1118 is configured to process the task and generate results. The results may be consumed by other tasks within the GPC 1118, routed to a different GPC 1118 via the XBar 1120, or stored in the memory 1104. The results can be written to the memory 1104 via the partition units 1122, which implement a memory interface for reading and writing data to/from the memory 1104. The results can be transmitted to another PPU or CPU via the high-speed GPU interconnect 1108. In an embodiment, the PPU 1100 includes a number U of partition units 1122 that is equal to the number of separate and distinct memory devices 1104 coupled to the PPU 1100. A partition unit 1122 will be described in more detail below.

In an embodiment, a host processor executes a driver kernel that implements an application programming interface ("API") that enables one or more applications executing on the host processor to schedule operations for execution on the PPU 1100. In an embodiment, multiple compute applications are simultaneously executed by the PPU 1100 and the PPU 1100 provides isolation, quality of service ("QoS"), and independent address spaces for the multiple compute applications. In an embodiment, an application generates instructions (e.g., in the form of API calls) that cause the driver kernel to generate one or more tasks for execution by the PPU 1100, and the driver kernel outputs tasks to one or more streams being processed by the PPU 1100. In an embodiment, each task comprises one or more groups of related threads, which may be referred to as a warp. In an embodiment, a warp comprises a plurality of related threads (e.g., 32 threads) that can be executed in parallel. In an embodiment, cooperating threads can refer to a plurality of threads including instructions to perform the task and that exchange data through shared memory. Threads and cooperating threads are described in more detail, in accordance with one embodiment below.

Figure 12:
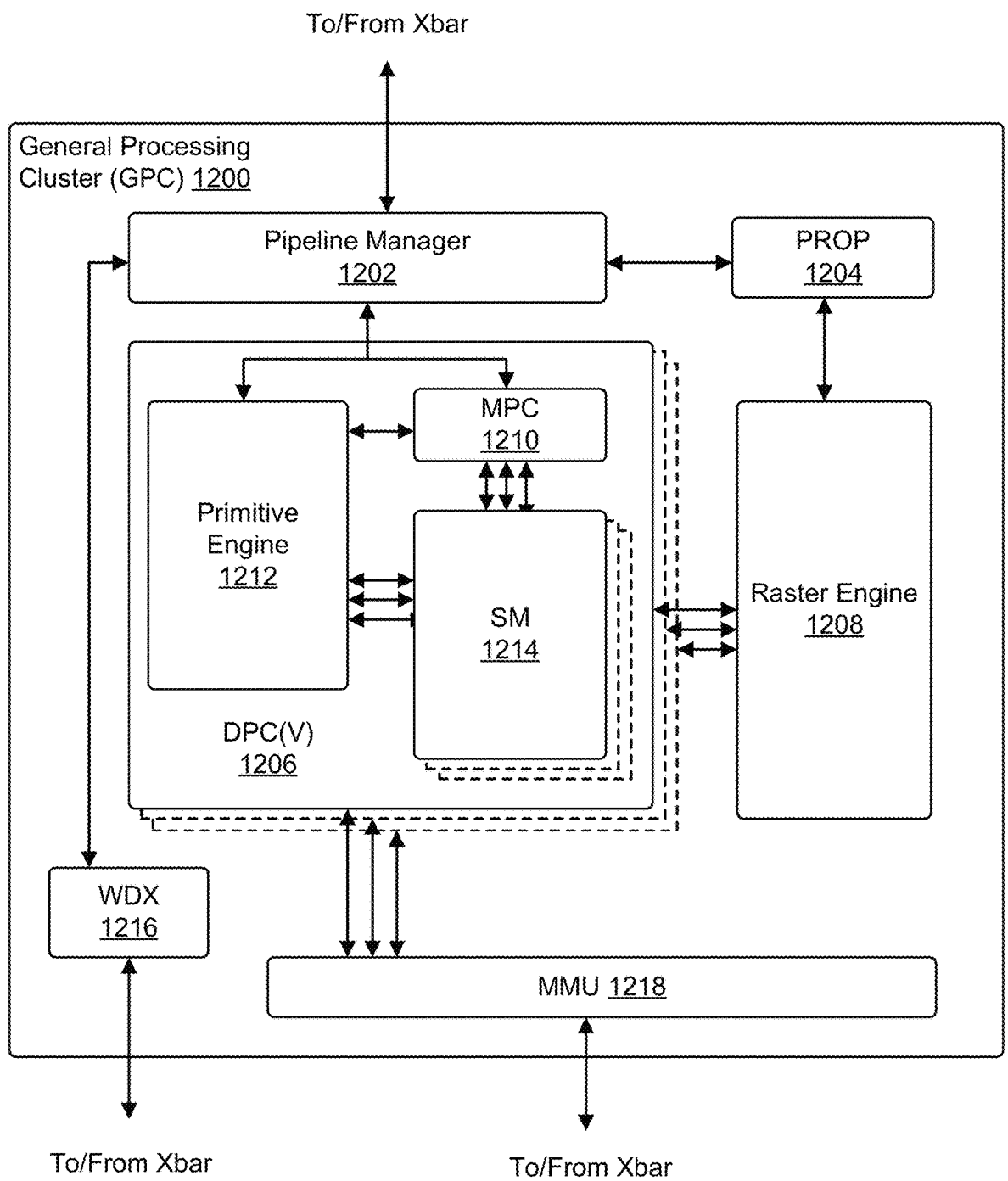
FIG. 12 illustrates an example of a general processing cluster ("GPC"), in accordance with one embodiment.

FIG. 12 illustrates a GPC 1200 such as the GPC illustrated of the PPU 1100 of FIG. 11, in accordance with one embodiment. In an embodiment, each GPC 1200 includes a number of hardware units for processing tasks and each GPC 1200 includes a pipeline manager 1202, a pre-raster operations unit ("PROP") 1204, a raster engine 1208, a work distribution crossbar ("WDX") 1216, a memory management unit ("MMU") 1218, one or more Data Processing Clusters ("DPCs") 1206, and any suitable combination of parts. It will be appreciated that the GPC 1200 of FIG. 12 may include other hardware units in lieu of or in addition to the units shown below.

In an embodiment, the operation of the GPC 1200 is controlled by the pipeline manager 1202. The pipeline manager 1202 manages the configuration of the one or more DPCs 1206 for processing tasks allocated to the GPC 1200. In an embodiment, the pipeline manager 1202 configures at least one of the one or more DPCs 1206 to implement at least a portion of a graphics rendering pipeline. In an embodiment, a DPC 1206 is configured to execute a vertex shader program on the programmable streaming multiprocessor ("SM") 1214. The pipeline manager 1202 is configured to route packets received from a work distribution to the appropriate logical units within the GPC 1200, in an embodiment, and some packets may be routed to fixed function hardware units in the PROP 1204 and/or raster engine 1208 while other packets may be routed to the DPCs 1206 for processing by the primitive engine 1212 or the SM 1214. In an embodiment, the pipeline manager 1202 configures at least one of the one or more DPCs 1206 to implement a neural network model and/or a computing pipeline.

The PROP unit 1204 is configured, in an embodiment, to route data generated by the raster engine 1208 and the DPCs 1206 to a Raster Operations ("ROP") unit in the memory partition unit, described in more detail above. In an embodiment, the PROP unit 1204 is configured to perform optimizations for color blending, organize pixel data, perform address translations, and more. The raster engine 1208 includes a number of fixed function hardware units configured to perform various raster operations, in an embodiment, and the raster engine 1208 includes a setup engine, a coarse raster engine, a culling engine, a clipping engine, a fine raster engine, a tile coalescing engine, and any suitable combination thereof. The setup engine, in an embodiment, receives transformed vertices and generates plane equations associated with the geometric primitive defined by the vertices; the plane equations are transmitted to the coarse raster engine to generate coverage information (e.g., an x, y coverage mask for a tile) for the primitive; the output of the coarse raster engine is transmitted to the culling engine where fragments associated with the primitive that fail a z-test are culled, and transmitted to a clipping engine where fragments lying outside a viewing frustum are clipped. In an embodiment, the fragments that survive clipping and culling are passed to the fine raster engine to generate attributes for the pixel fragments based on the plane equations generated by the setup engine. In an embodiment, the output of the raster engine 1208 comprises fragments to be processed by any suitable entity such as by a fragment shader implemented within a DPC 1206.

In an embodiment, each DPC 1206 included in the GPC 1200 comprises an M-Pipe Controller ("MPC") 1210; a primitive engine 1212; one or more SMs 1214; and any suitable combination thereof. In an embodiment, the MPC 1210 controls the operation of the DPC 1206, routing packets received from the pipeline manager 1202 to the appropriate units in the DPC 1206. In an embodiment, packets associated with a vertex are routed to the primitive engine 1212, which is configured to fetch vertex attributes associated with the vertex from memory; in contrast, packets associated with a shader program may be transmitted to the SM 1214.

In an embodiment, the SM 1214 comprises a programmable streaming processor that is configured to process tasks represented by a number of threads. In an embodiment, the SM 1214 is multi-threaded and configured to execute a plurality of threads (e.g., 32 threads) from a particular group of threads concurrently and implements a SIMD (Single-Instruction, Multiple-Data) architecture where each thread in a group of threads (e.g., a warp) is configured to process a different set of data based on the same set of instructions. In an embodiment, all threads in the group of threads execute the same instructions. In an embodiment, the SM 1214 implements a SIMT (Single-Instruction, Multiple Thread) architecture wherein each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. In an embodiment, execution state is maintained for each individual thread, and threads executing the same instructions may be converged and executed in parallel for better efficiency. In an embodiment, the SM 1214 is described in more detail below.

In an embodiment, the MMU 1218 provides an interface between the GPC 1200 and the memory partition unit and the MMU 1218 provides translation of virtual addresses into physical addresses, memory protection, and arbitration of memory requests. In an embodiment, the MMU 1218 provides one or more translation lookaside buffers ("TLBs") for performing translation of virtual addresses into physical addresses in memory.

Figure 13:
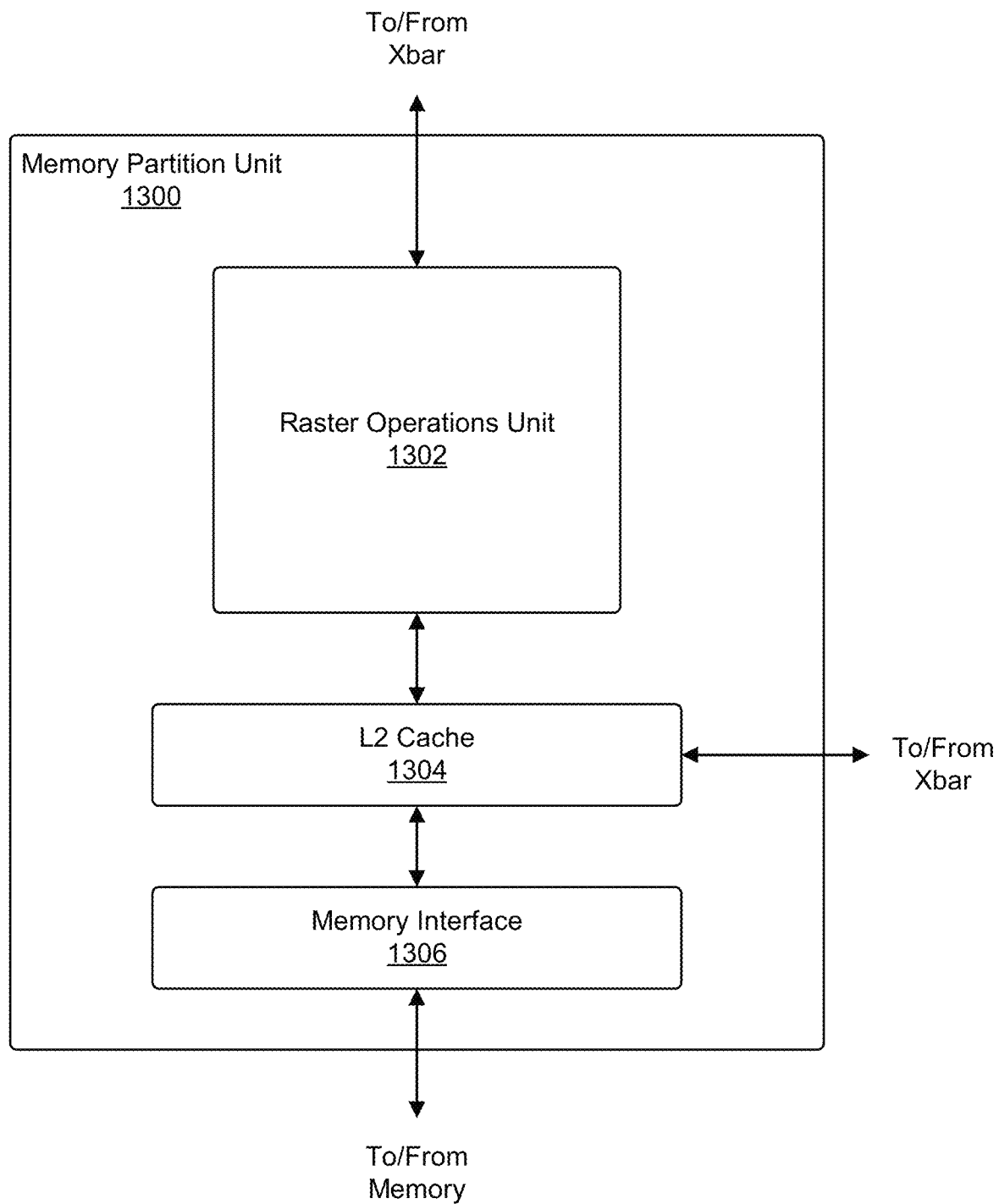
FIG. 13 illustrates an example of a memory partition unit, in accordance with one embodiment.

FIG. 13 illustrates a memory partition unit of a PPU, in accordance with one embodiment. In an embodiment, the memory partition unit 1300 includes a Raster Operations ("ROP") unit 1302; a level two ("L2") cache 1304; a memory interface 1306; and any suitable combination thereof. The memory interface 1306 is coupled to the memory. Memory interface 1306 may implement 32, 64, 128, 1024-bit data buses, or the like, for high-speed data transfer. In an embodiment, the PPU incorporates U memory interfaces 1306, one memory interface 1306 per pair of partition units 1300, where each pair of partition units 1300 is connected to a corresponding memory device. For example, PPU may be connected to up to Y memory devices, such as high bandwidth memory stacks or graphics double-data-rate, version 5, synchronous dynamic random access memory ("GDDR5 SDRAM").

In an embodiment, the memory interface 1306 implements an HBM2 memory interface and Y equals half U. In an embodiment, the HBM2 memory stacks are located on the same physical package as the PPU, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory supports Single-Error Correcting Double-Error Detecting ("SECDED") Error Correction Code ("ECC") to protect data. ECC provides higher reliability for compute applications that are sensitive to data corruption. Reliability is especially important in large-scale cluster computing environments where PPUs process very large datasets and/or run applications for extended periods.

In an embodiment, the PPU implements a multi-level memory hierarchy. In an embodiment, the memory partition unit 1300 supports a unified memory to provide a single unified virtual address space for CPU and PPU memory, enabling data sharing between virtual memory systems. In an embodiment the frequency of accesses by a PPU to memory located on other processors is traced to ensure that memory pages are moved to the physical memory of the PPU that is accessing the pages more frequently. In an embodiment, the high-speed GPU interconnect 2618 supports address translation services allowing the PPU to directly access a CPU's page tables and provides full access to CPU memory by the PPU.

In an embodiment, copy engines transfer data between multiple PPUs or between PPUs and CPUs. In an embodiment, the copy engines can generate page faults for addresses that are not mapped into the page tables, and the memory partition unit 1300 then services the page faults, mapping the addresses into the page table, after which the copy engine performs the transfer. In an embodiment, memory is pinned (i.e., non-pageable) for multiple copy engine operations between multiple processors, substantially reducing the available memory. In an embodiment, with hardware page faulting, addresses can be passed to the copy engines without regards as to whether the memory pages are resident, and the copy process is transparent.

Data from the memory above or other system memory is fetched by the memory partition unit 1300 and stored in the L2 cache 1304, which is located on-chip and is shared between the various GPCs, in accordance with one embodiment. Each memory partition unit 1300, in an embodiment, includes at least a portion of the L2 cache 1304 associated with a corresponding memory device. In an embodiment, lower level caches are implemented in various units within the GPCs. In an embodiment, each of the SMs may implement a level one ("L1") cache wherein the L1 cache is private memory that is dedicated to a particular SM and data from the L2 cache 1304 is fetched and stored in each of the L1 caches for processing in the functional units of the SMs. In an embodiment, the L2 cache 1304 is coupled to the memory interface 1306 and the XBar.

The ROP unit 1302 performs graphics raster operations related to pixel color, such as color compression, pixel blending, and more, in an embodiment. The ROP unit 1302, in an embodiment, implements depth testing in conjunction with the raster engine 1308, receiving a depth for a sample location associated with a pixel fragment from the culling engine of the raster engine. In an embodiment, the depth is tested against a corresponding depth in a depth buffer for a sample location associated with the fragment. In an embodiment, if the fragment passes the depth test for the sample location, then the ROP unit 1302 updates the depth buffer and transmits a result of the depth test to the raster engine. It will be appreciated that the number of partition units 1300 may be different than the number of GPCs and, therefore, each ROP unit 1302 can, in an embodiment, be coupled to each of the GPCs. In an embodiment, the ROP unit 1302 tracks packets received from the different GPCs and determines which result generated by the ROP unit 1302 is routed to through the Xbar.

Figure 14:
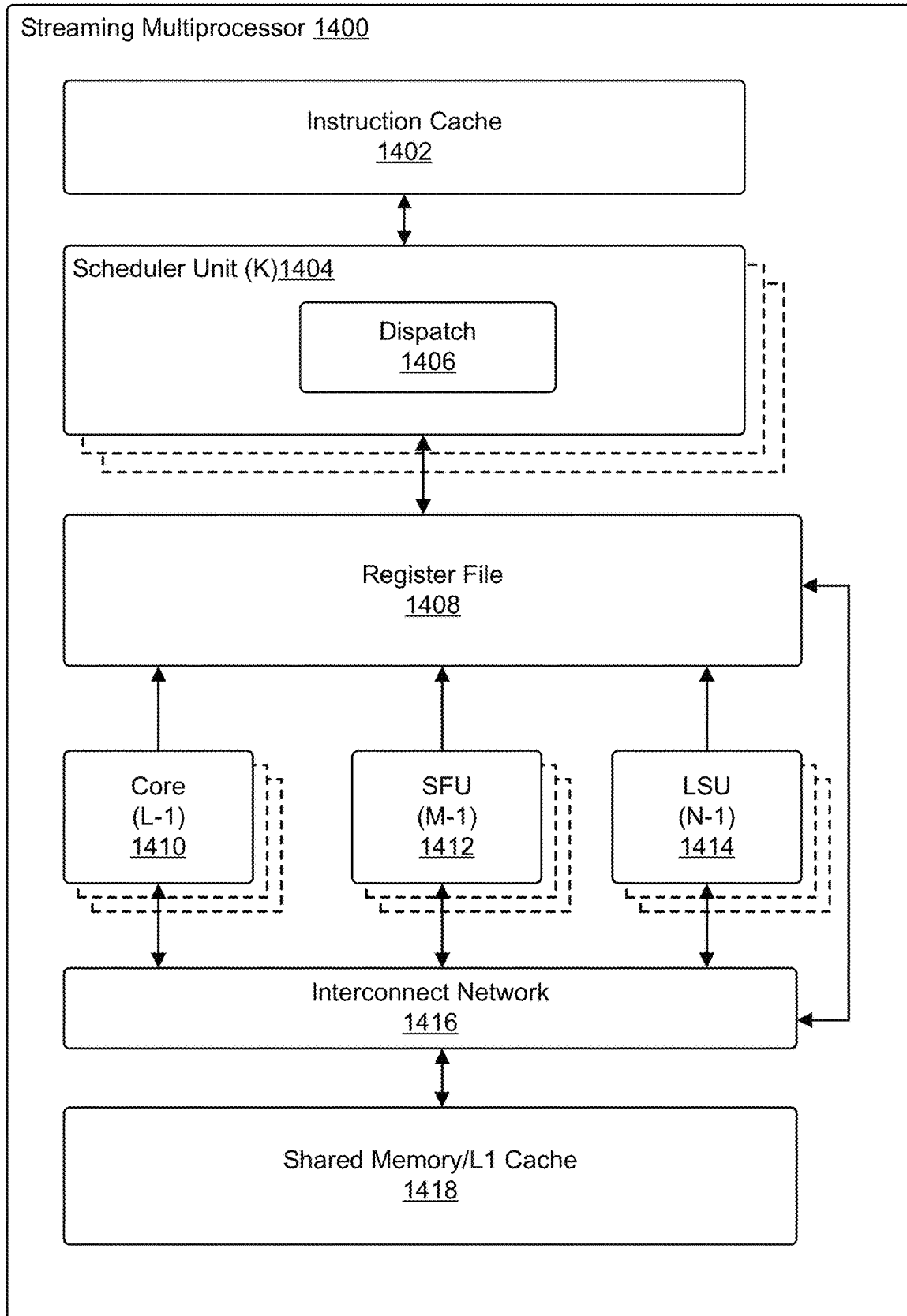
FIG. 14 illustrates an example of a streaming multi-processor, in accordance with one embodiment.

FIG. 14 illustrates a streaming multi-processor such as the streaming multi-processor above, in accordance with one embodiment. In an embodiment, the SM 1400 includes: an instruction cache 1402; one or more scheduler units 1404; a register file 1408; one or more processing cores 1410; one or more special function units ("SFUs") 1412; one or more load/store units ("LSUs") 1414; an interconnect network 1416; a shared memory/L1 cache 1418; and any suitable combination thereof. In an embodiment, the work distribution unit dispatches tasks for execution on the GPCs of the PPU and each task is allocated to a particular DPC within a GPC and, if the task is associated with a shader program, the task is allocated to an SM 1400. In an embodiment, the scheduler unit 1404 receives the tasks from the work distribution unit and manages instruction scheduling for one or more thread blocks assigned to the SM 1400. In an embodiment, the scheduler unit 1404 schedules thread blocks for execution as warps of parallel threads, wherein each thread block is allocated at least one warp. In an embodiment, each warp executes threads. In an embodiment, the scheduler unit 1404 manages a plurality of different thread blocks, allocating the warps to the different thread blocks and then dispatching instructions from the plurality of different cooperative groups to the various functional units (e.g., cores 1410, SFUs 1412, and LSUs 1414) during each clock cycle.

Cooperative Groups may refer to a programming model for organizing groups of communicating threads that allows developers to express the granularity at which threads are communicating, enabling the expression of richer, more efficient parallel decompositions. In an embodiment, cooperative launch APIs support synchronization among thread blocks for the execution of parallel algorithms. In an embodiment, applications of conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces. Cooperative Groups enable programmers to define groups of threads explicitly at sub-block (i.e., as small as a single thread) and multi-block granularities, and to perform collective operations such as synchronization on the threads in a cooperative group. The programming model supports clean composition across software boundaries so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

In an embodiment, a dispatch unit 1406 is configured to transmit instructions to one or more of the functional units, and the scheduler unit 1404 includes two dispatch units 1406 that enable two different instructions from the same warp to be dispatched during each clock cycle. In an embodiment, each scheduler unit 1404 includes a single dispatch unit 1406 or additional dispatch units 1406.

Each SM 1400, in an embodiment, includes a register file 1408 that provides a set of registers for the functional units of the SM 1400. In an embodiment, the register file 1408 is divided between each of the functional units such that each functional unit is allocated a dedicated portion of the register file 1408. In an embodiment, the register file 1408 is divided between the different warps being executed by the SM 1400 and the register file 1408 provides temporary storage for operands connected to the data paths of the functional units. In an embodiment, each SM 1400 comprises a plurality of L processing cores 1410. In an embodiment, the SM 1400 includes a large number (e.g., 128 or more) of distinct processing cores 1410. Each core 1410, in an embodiment, includes a fully pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 1410 include 64 single-precision (32-bit) floating point cores, 64 integer cores, 32 double-precision (64-bit) floating point cores, and 8 tensor cores.

Tensor cores are configured to perform matrix operations in accordance with an embodiment. In an embodiment, one or more tensor cores are included in the cores 1410. In an embodiment, the tensor cores are configured to perform deep learning matrix arithmetic, such as convolution operations for neural network training and inferencing. In an embodiment, each tensor core operates on a 4×4 matrix and performs a matrix multiply and accumulate operation D=A× B+C, where A, B, C, and D are 4×4 matrices.

In an embodiment, the matrix multiply inputs A and B are 16-bit floating point matrices and the accumulation matrices C and D are 16-bit floating point or 32-bit floating point matrices. In an embodiment, the tensor cores operate on 16-bit floating point input data with 32-bit floating point accumulation. In an embodiment, the 16-bit floating point multiply requires 64 operations and results in a full precision product that is then accumulated using 32-bit floating point addition with the other intermediate products for a 4×4×4 matrix multiply. Tensor cores are used to perform much larger two-dimensional or higher dimensional matrix operations, built up from these smaller elements, in an embodiment. In an embodiment, an API, such as CUDA 9 C++ API, exposes specialized matrix load, matrix multiply and accumulate, and matrix store operations to efficiently use tensor cores from a CUDA-C++ program. In an embodiment, at the CUDA level, the warp-level interface assumes 16×16 size matrices spanning all 32 threads of the warp.

In an embodiment, each SM 1400 comprises M SFUs 1412 that perform special functions (e.g., attribute evaluation, reciprocal square root, and the like). In an embodiment, the SFUs 1412 include a tree traversal unit configured to traverse a hierarchical tree data structure. In an embodiment, the SFUs 1412 include a texture unit configured to perform texture map filtering operations. In an embodiment, the texture units are configured to load texture maps (e.g., a 2D array of texels) from the memory and sample the texture maps to produce sampled texture values for use in shader programs executed by the SM 1400. In an embodiment, the texture maps are stored in the shared memory/L1 cache. The texture units implement texture operations such as filtering operations using mip-maps (e.g., texture maps of varying levels of detail), in accordance with one embodiment. In an embodiment, each SM 1400 includes two texture units.

Each SM 1400 comprises N LSUs that implement load and store operations between the shared memory/L1 cache and the register file 1408, in an embodiment. Each SM 1400 includes an interconnect network 1416 that connects each of the functional units to the register file 1408 and the LSU 1414 to the register file 1408, shared memory/L1 cache 1418 in an embodiment. In an embodiment, the interconnect network 1416 is a crossbar that can be configured to connect any of the functional units to any of the registers in the register file 1408 and connect the LSUs 1414 to the register file and memory locations in shared memory/L1 cache 1418.

The shared memory/L1 cache 1418 is an array of on-chip memory that allows for data storage and communication between the SM 1400 and the primitive engine and between threads in the SM 1400 in an embodiment. In an embodiment, the shared memory/L1 cache 1418 comprises 128 KB of storage capacity and is in the path from the SM 1400 to the partition unit. The shared memory/L1 cache 1418, in an embodiment, is used to cache reads and writes. One or more of the shared memory/L1 cache 1418, L2 cache, and memory are backing stores.

Combining data cache and shared memory functionality into a single memory block provides improved performance for both types of memory accesses, in an embodiment. The capacity, in an embodiment, is used or is usable as a cache by programs that do not use shared memory, such as if shared memory is configured to use half of the capacity, texture and load/store operations can use the remaining capacity. Integration within the shared memory/L1 cache 1418 enables the shared memory/L1 cache 1418 to function as a high-throughput conduit for streaming data while simultaneously providing high-bandwidth and low-latency access to frequently reused data, in accordance with an embodiment. When configured for general purpose parallel computation, a simpler configuration can be used compared with graphics processing. In an embodiment, fixed function graphics processing units are bypassed, creating a much simpler programming model. In the general purpose parallel computation configuration, the work distribution unit assigns and distributes blocks of threads directly to the DPCs, in an embodiment. The threads in a block execute the same program, using a unique thread ID in the calculation to ensure each thread generates unique results, using the SM 1400 to execute the program and perform calculations, shared memory/L1 cache 1418 to communicate between threads, and the LSU 1414 to read and write global memory through the shared memory/L1 cache 1418 and the memory partition unit, in accordance with one embodiment. In an embodiment, when configured for general purpose parallel computation, the SM 1400 writes commands that the scheduler unit can use to launch new work on the DPCs.

In an embodiment, the PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, and more. In an embodiment, the PPU is embodied on a single semiconductor substrate. In an embodiment, the PPU is included in a system-on-a-chip ("SoC") along with one or more other devices such as additional PPUs, the memory, a reduced instruction set computer ("RISC") CPU, a memory management unit ("MMU"), a digital-to-analog converter ("DAC"), and the like.

In an embodiment, the PPU may be included on a graphics card that includes one or more memory devices. The graphics card may be configured to interface with a PCIe slot on a motherboard of a desktop computer. In yet another embodiment, the PPU may be an integrated graphics processing unit ("iGPU") included in the chipset of the motherboard.

Figure 15:
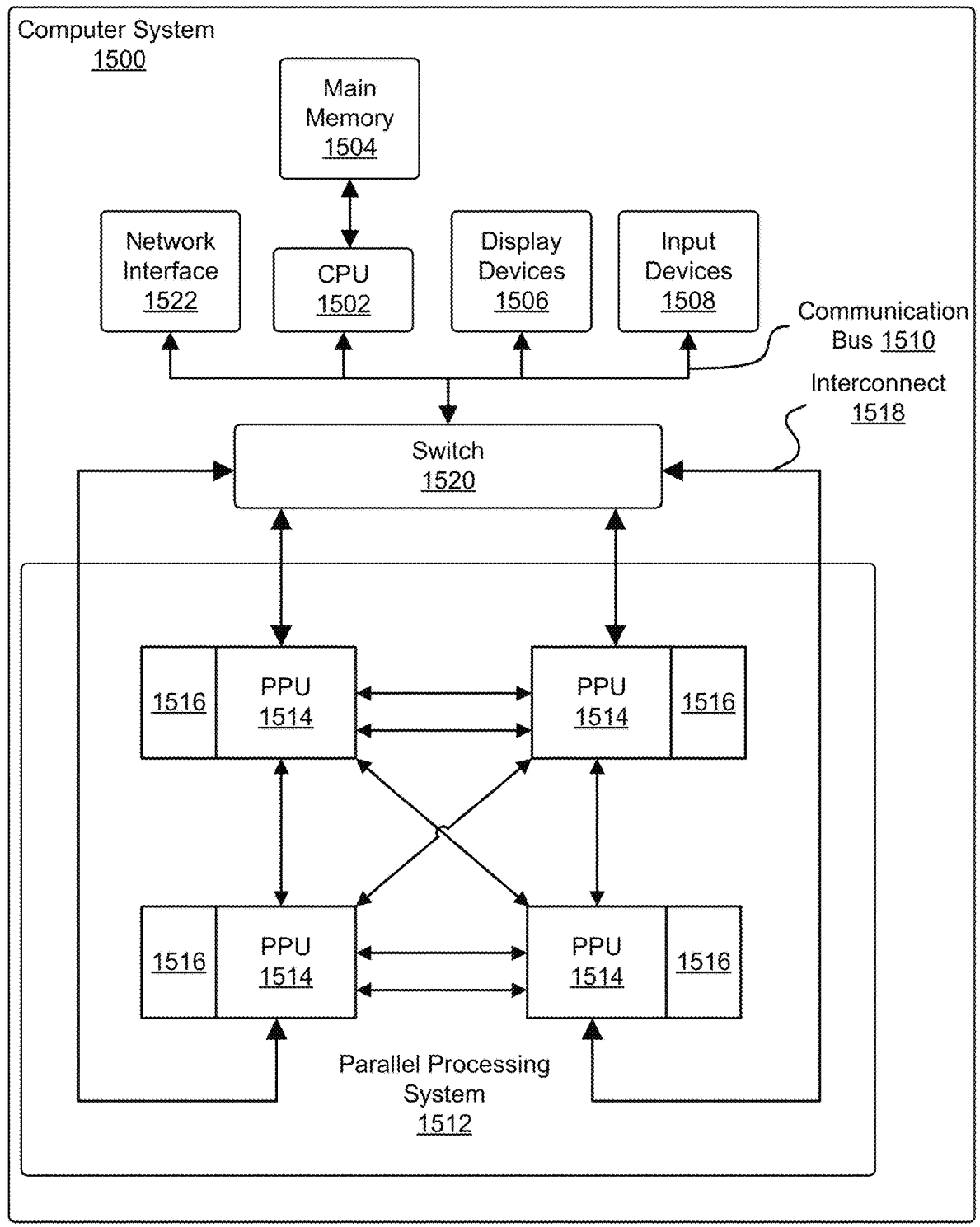
FIG. 15 illustrates a computer system in which the various examples can be implemented, in accordance with one embodiment.

FIG. 15 illustrates a computer system 1500 in which the various architecture and/or functionality can be implemented, in accordance with one embodiment. The computer system 1500, in an embodiment, is configured to implement various processes and methods described throughout this disclosure.

In an embodiment, the computer system 1500 comprises at least one central processing unit 1502 that is connected to a communication bus 1510 implemented using any suitable protocol, such as PCI (Peripheral Component Interconnect), PCI-Express, AGP (Accelerated Graphics Port), Hyper-Transport, or any other bus or point-to-point communication protocol(s). In an embodiment, the computer system 1500 includes a main memory 1504 and control logic (e.g., implemented as hardware, software, or a combination thereof) and data are stored in the main memory 1504 which may take the form of random access memory ("RAM"). In an embodiment, a network interface subsystem 1522 provides an interface to other computing devices and networks for receiving data from and transmitting data to other systems from the computer system 1500.

The computer system 1500, in an embodiment, includes input devices 1508, the parallel processing system 1512, and display devices 1506 which can be implemented using a conventional CRT (cathode ray tube), LCD (liquid crystal display), LED (light emitting diode), plasma display, or other suitable display technologies. In an embodiment, user input is received from input devices 1508 such as keyboard, mouse, touchpad, microphone, and more. In an embodiment, each of the foregoing modules can be situated on a single semiconductor platform to form a processing system.

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit ("CPU") and bus implementation. Of course, the various modules may also be situated separately or in various combinations of semiconductor platforms per the desires of the user.

In an embodiment, computer programs in the form of machine-readable executable code or computer control logic algorithms are stored in the main memory 1504 and/or secondary storage. Computer programs, if executed by one or more processors, enable the computer system 1500 to perform various functions in accordance with one embodiment. The memory 1504, the storage, and/or any other storage are possible examples of computer-readable media. Secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory.

In an embodiment, the architecture and/or functionality of the various previous figures are implemented in the context of the central processor 1502; parallel processing system 1512; an integrated circuit capable of at least a portion of the capabilities of both the central processor 1502; the parallel processing system 1512; a chipset (e.g., a group of integrated circuits designed to work and sold as a unit for performing related functions, etc.); and any suitable combination of integrated circuit.

In an embodiment, the architecture and/or functionality of the various previous figures is implemented in the context of a general computer system, a circuit board system, a game console system dedicated for entertainment purposes, an application-specific system, and more. In an embodiment, the computer system 1500 may take the form of a desktop computer, a laptop computer, a tablet computer, servers, supercomputers, a smart-phone (e.g., a wireless, hand-held device), personal digital assistant ("PDA"), a digital camera, a vehicle, a head-mounted display, a hand-held electronic device, a mobile phone device, a television, workstation, game consoles, embedded system, and/or any other type of logic.

In an embodiment, a parallel processing system 1512 includes a plurality of PPUs 1514 and associated memories 1516. In an embodiment, the PPUs are connected to a host processor or other peripheral devices via an interconnect 1518 and a switch 1520 or multiplexer. In an embodiment, the parallel processing system 1512 distributes computational tasks across the PPUs 1514 which can be parallelizable—for example, as part of the distribution of computational tasks across multiple GPU thread blocks. In an embodiment, memory is shared and accessible (e.g., for read and/or write access) across some or all of the PPUs 1514, although such shared memory may incur performance penalties relative to the use of local memory and registers resident to a PPU. In an embodiment, the operation of the PPUs 1514 is synchronized through the use of a command such as _syncthreads( ) which requires all threads in a block (e.g., executed across multiple PPUs 1514) to reach a certain point of execution of code before proceeding.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer system comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

In the description and claims, the terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered a system.

In the present document, references may be made to obtaining, acquiring, receiving, or inputting analog or digital data into a subsystem, computer system, or computer-implemented machine. The process of obtaining, acquiring, receiving, or inputting analog and digital data can be accomplished in a variety of ways such as by receiving the data as a parameter of a function call or a call to an application programming interface. In some implementations, the process of obtaining, acquiring, receiving, or inputting analog or digital data can be accomplished by transferring the data via a serial or parallel interface. In another implementation, the process of obtaining, acquiring, receiving, or inputting analog or digital data can be accomplished by transferring the data via a computer network from the providing entity to the acquiring entity. References may also be made to providing, outputting, transmitting, sending, or presenting analog or digital data. In various examples, the process of providing, outputting, transmitting, sending, or presenting analog or digital data can be accomplished by transferring the data as an input or output parameter of a function call, a parameter of an application programming interface or interprocess communication mechanism.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

At least one embodiment of the disclosure can be described in view of the following clauses:

1. An eye box expander, comprising:
   an incoupling element positioned to direct an image into a wave guide such that the image is internally reflected within the wave guide; and
   an outcoupling element positioned to direct the image across the wave guide and to a holographic optical element.
2. The eye box expander of clause 1, wherein the incoupling element comprises an optical grating.
3. The eye box expander of clause 1 or 2, wherein the outcoupling element comprises an optical grating.
4. The eye box expander of any of clauses 1-3, wherein the incoupling element comprises a prism.
5. The eye box expander of any of clauses 1-4, wherein the outcoupling element comprises a set of half-silvered mirrors.
6. The eye box expander of any of clauses 1-5, wherein the holographic optical element generates a plurality of Maxwellian viewpoints.
7. The eye box expander of any of clauses 1-6, wherein the thickness of the eye box expander is less than or equal to 4 mm.
8. The eye box expander of any of clauses 1-7, wherein an output of the eye box expander is provided with a field of view of between 50 and 144 degrees.
9. The eye box expander of any of clauses 1-8, wherein an output of the eye box expander is provided with a field of view of greater than 65 degrees.
10. The eye box expander of any of clauses 1-9, wherein the holographic optical element is produced using a holographic printer.

11. The eye box expander of any of clauses 1-10, wherein eye relief of the eye box expander is between 10 and 15 mm.

12 The eye box expander of clause 5, further comprising a display that injects a second image into an end of a wave guide opposite the incoupling element, such that the second image is reflected to a user via the set of half-silvered mirrors.

13 The eye box expander of any of clauses 1-12, wherein the image is reflected from the holographic optical element to an observer with an expanded eye box and an expanded field of view.

14. The eye box expander of any of clauses 1-13, wherein:
the incoupling element is attached to the wave guide;
the outcoupling element is attached to the wave guide; and
the holographic optical element is attached to the wave guide opposite the outcoupling element.

15. A set of eyewear comprising the eye box expander of any of clauses 1-14.

16. An augmented reality display, comprising:
an eyewear system that includes a lens that acts as a wave guide;
an incoupling element positioned to direct a light field into the lens such that the light field is internally reflected within the lens; and
an outcoupling element positioned to direct the light field to a holographic optical element attached to the lens opposite the outcoupling element.

17. The augmented reality display of clause 16, wherein the incoupling element comprises an optical grating.

18. The augmented reality display of clause 16 or 17, wherein the outcoupling element comprises an optical grating.

19. The augmented reality display of any of clauses 16-18, wherein the incoupling element comprises a prism.

20. The augmented reality display of any of clauses 16-19, wherein the outcoupling element comprises a set of half-silvered mirrors.

21. The augmented reality display of any of clauses 16-20, wherein the holographic optical element generates a plurality of Maxwellian viewpoints.

22. The augmented reality display of any of clauses 16-21, wherein the thickness of the lens is less than or equal to 4 mm.

23. The augmented reality display of any of clauses 16-22, wherein the light field is generated by an electronic display.

24. The augmented reality display of clause 23, wherein the electronic display is connected to a computer system having one or more processors and memory storing executable instructions that, as a result of being executed by the one or more processors, cause the computer system to send image data to the electronic display.

25. The augmented reality display of any of clauses 16-24, wherein the light field is superimposed on an image transmitted through the lens.

26. The augmented reality display of any of clauses 16-25, wherein eye relief of the augmented reality display is between 10 and 15 mm.

27. The augmented reality display of clause 20, further comprising a micro-LED that injects an image into an end of the lens opposite the incoupling element, such that the image is reflected to a user via the set of half-silvered mirrors.

28. The augmented reality display of any of clauses 16-27, wherein the light field is reflected from the holographic optical element to an observer with an expanded eye box and an expanded field of view.

29. A method of making an image expander comprising:
attaching an incoupling element to a wave guide such that an image is directed into the wave guide and the image is internally reflected within the wave guide; and
attaching an outcoupling element to the wave guide to direct the image across the wave guide and to a holographic optical element.

30. The method of clause 29, wherein the incoupling element comprises an optical grating.

31. The method of clause 29 or 30, wherein the outcoupling element comprises an optical grating.

32. The method of any of clauses 29-31, wherein the incoupling element comprises a prism.

33. The method of any of clauses 29-32, wherein the outcoupling element comprises a set of half-silvered mirrors.

34. The method of any of clauses 29-33, further comprising producing the holographic optical element using a holographic printer.

35. The method of any of clauses 29-34, wherein the image is reflected from the holographic optical element to an observer with an expanded eye box and an expanded field of view.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An eye box expander, comprising:
an incoupling element attached to a first side of a wave guide and positioned to direct an image into the wave guide such that the image is internally reflected within the wave guide; and
an outcoupling element attached to the first side of the wave guide and positioned to duplicate the image and direct the duplicated image across the wave guide and to a holographic optical element attached to a second side of the wave guide opposite the first side of the wave guide,
wherein an output of the eye box expander is provided with a field of view of greater than 50 degrees.

2. The eye box expander of claim 1, wherein one or both of the incoupling element or the outcoupling element comprises an optical grating.

3. The eye box expander of claim 1, wherein the incoupling element comprises a prism.

4. The eye box expander of claim 1, wherein the outcoupling element comprises a set of half-silvered mirrors.

5. The eye box expander of claim 1, wherein the holographic optical element is capable of generating a plurality of Maxwellian view displays.

6. The eye box expander of claim 5, wherein the plurality of Maxwellian view displays comprises a plurality of virtual retinal displays.

7. The eye box expander of claim 5, wherein each Maxwellian view display of the plurality of Maxwellian view displays comprises a display which collects light to a center of a pupil of a user's eye to achieve an in-focus image independent of a focus depth of the user's eye.

8. The eye box expander of claim 1, wherein a thickness of the eye box expander is less than or equal to 4 mm.

9. The eye box expander of claim 1, wherein the holographic optical element is produced using a holographic printer.

10. The eye box expander of claim 1, wherein eye relief of the eye box expander is between 10 mm and 15 mm.

11. The eye box expander of claim 4, further comprising a display that injects a second image into an end of the wave guide opposite the incoupling element, such that the second image is reflected to a user via the set of half-silvered mirrors.

12. The eye box expander of claim 1, wherein the duplicated image is reflected from the holographic optical element to an observer with an expanded eye box and an expanded field of view.

13. A set of eyewear with an eye box expander comprising:
an incoupling element attached to a first side of a wave guide and positioned to direct an image into the wave guide such that the image is internally reflected within the wave guide; and
an outcoupling element attached to the first side of the wave guide and positioned to duplicate the image and direct the duplicated image across the wave guide and to a holographic optical element attached to a second side of the wave guide opposite the first side of the wave guide,
wherein an output of the eye box expander is provided with a field of view of greater than 50 degrees.

14. An augmented reality display, comprising:
an eyewear system that includes a lens that acts as a wave guide;
an incoupling element attached to a first side of the lens and positioned to direct a light field into the lens such that the light field is internally reflected within the lens; and
an outcoupling element attached to the first side of the lens and positioned to duplicate the light field and direct the duplicated light field across the lens and to a holographic optical element attached to a second side of the lens opposite the first side of the lens,
wherein the augmented reality display is provided with a field of view of greater than 50 degrees.

15. The augmented reality display of claim 14, wherein one or both of the incoupling element or the outcoupling element comprises an optical grating.

16. The augmented reality display of claim 14, wherein the incoupling element comprises a prism.

17. The augmented reality display of claim 14, wherein the outcoupling element comprises a set of half-silvered mirrors.

18. The augmented reality display of claim 14, wherein the holographic optical element is capable of generating a plurality of Maxwellian view displays.

19. The augmented reality display of claim 18, wherein the plurality of Maxwellian view displays comprises a plurality of virtual retinal displays.

20. The augmented reality display of claim 18, wherein each Maxwellian view display of the plurality of Maxwellian view displays comprises a display which collects light to a center of a pupil of a user's eye to achieve an in-focus image independent of a focus depth of the user's eye.

21. The augmented reality display of claim 14, wherein a thickness of the lens is less than or equal to 4 mm.

22. The augmented reality display of claim 14, wherein the light field is generated by an electronic display.

23. The augmented reality display of claim 22, wherein the electronic display is connected to a computer system having one or more processors and memory storing executable instructions that, if executed by the one or more processors, cause the computer system to send image data to the electronic display.

24. The augmented reality display of claim 14, wherein the duplicated light field is superimposed on an image transmitted through the lens.

25. The augmented reality display of claim 14, wherein eye relief of the augmented reality display is between 10 mm and 15 mm.

26. The augmented reality display of claim 17, further comprising a micro LED that injects an image into an end of the lens opposite the incoupling element, such that the image is reflected to a user via the set of half-silvered mirrors.

27. The augmented reality display of claim 14, wherein the duplicated light field is reflected from the holographic optical element to an observer with an expanded eye box and an expanded field of view.

28. A method of making an image expander, the method comprising:
attaching an incoupling element to a first side of a wave guide such that an image is directed into the wave guide and the image is internally reflected within the wave guide; and
attaching an outcoupling element to the first side of the wave guide to duplicate the image and direct the duplicated image across the wave guide and to a holographic optical element attached to a second side of the wave guide opposite the first side of the wave guide,
wherein the image expander is provided with a field of view of greater than 50 degrees.

29. The method of claim 28, wherein one or both of the incoupling element or the outcoupling element comprises an optical grating.

30. The method of claim 28, wherein the incoupling element comprises a prism.

31. The method of claim 28, wherein the outcoupling element comprises a set of half-silvered mirrors.

32. The method of claim 28, further comprising producing the holographic optical element using a holographic printer.

33. The method of claim 28, wherein the duplicated image is reflected from the holographic optical element to an observer with an expanded eye box and an expanded field of view.

* * * * *